(12) United States Patent
Lee et al.

(10) Patent No.: US 11,423,878 B2
(45) Date of Patent: Aug. 23, 2022

(54) INTELLIGENT VOICE RECOGNIZING METHOD, APPARATUS, AND INTELLIGENT COMPUTING DEVICE

(71) Applicant: LG ELECTRONICS INC., Seoul (KR)

(72) Inventors: Sangwon Lee, Seoul (KR); Youmi Jun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 354 days.

(21) Appl. No.: 16/710,866

(22) Filed: Dec. 11, 2019

(65) Prior Publication Data
US 2020/0118544 A1   Apr. 16, 2020

(30) Foreign Application Priority Data
Jul. 17, 2019  (KR) .................. 10-2019-0086309

(51) Int. Cl.
*G10L 15/00* (2013.01)
*G10L 15/30* (2013.01)

(52) U.S. Cl.
CPC ............ *G10L 15/005* (2013.01); *G10L 15/30* (2013.01)

(58) Field of Classification Search
CPC ....... G10L 15/005; G10L 15/30; G10L 15/22; G10L 2015/0635; G10L 2015/223; G10L 15/063; G10L 17/24; G10L 15/183; G10L 17/04; G10L 17/12; H04L 5/0044; H04W 74/004

USPC ........................................................ 704/270
See application file for complete search history.

(56) References Cited

U.S. PATENT DOCUMENTS

| | | | |
|---|---|---|---|
| 6,581,036 B1* | 6/2003 | Varney, Jr. | G07C 9/257 704/275 |
| 8,255,009 B2* | 8/2012 | Sorensen | H03F 3/195 455/571 |
| 10,645,086 B1* | 5/2020 | Hadler | G06F 21/316 |
| 2005/0089172 A1* | 4/2005 | Fujimoto | G10L 17/24 380/275 |
| 2007/0112571 A1* | 5/2007 | Thirugnana | H04M 1/2757 704/201 |
| 2013/0289999 A1* | 10/2013 | Hymel | G10L 15/063 |

(Continued)

*Primary Examiner* — Thuykhanh Le
(74) *Attorney, Agent, or Firm* — Birch, Stewart, Kolasch & Birch, LLP

(57) ABSTRACT

Disclosed are an intelligent voice recognizing method, a voice recognizing apparatus, and an intelligent computing device. The an intelligent voice recognizing method according to an embodiment of the present disclosure receives a voice, acquires a sequential start language uttered sequentially with a utterance language from the voice, and sets the sequential start language as an additional start language other than a basic start language when the sequential start language is recognized as a start language of a voice recognizing apparatus, thereby being able to authenticate a user and recognize a voice even through a seamless scheme voice that is uttered in an actual situation. According to the present disclosure, one or more of the voice recognizing device, intelligent computing device, and server may be related to artificial intelligence (AI) modules, unmanned aerial vehicles (UAVs), robots, augmented reality (AR) devices, virtual reality (VR) devices, and 5G service-related devices.

14 Claims, 16 Drawing Sheets

(56) References Cited

U.S. PATENT DOCUMENTS

| | | | |
|---|---|---|---|
| 2014/0161263 A1* | 6/2014 | Koishida | G10L 19/018 381/56 |
| 2015/0015690 A1* | 1/2015 | Roh | H04N 21/4223 348/77 |
| 2015/0098523 A1* | 4/2015 | Lim | H03F 1/0227 375/297 |
| 2015/0141079 A1* | 5/2015 | Wang | H04M 1/6041 455/563 |
| 2015/0142438 A1* | 5/2015 | Dai | G10L 17/02 704/275 |
| 2015/0161990 A1* | 6/2015 | Sharifi | G10L 15/26 704/251 |
| 2015/0220715 A1* | 8/2015 | Kim | G06F 21/32 726/18 |
| 2015/0331490 A1* | 11/2015 | Yamada | G06F 3/017 345/156 |
| 2016/0140961 A1* | 5/2016 | Sharifi | G06F 3/167 704/254 |
| 2016/0163312 A1* | 6/2016 | Henton | G10L 13/08 704/270.1 |
| 2016/0350611 A1* | 12/2016 | Zhang | G10L 15/22 |
| 2017/0105112 A1* | 4/2017 | Park | H04W 8/005 |
| 2017/0180362 A1* | 6/2017 | Du | G06V 40/176 |
| 2017/0199543 A1* | 7/2017 | Rhee | G06F 1/1605 |
| 2017/0289633 A1* | 10/2017 | Tokunaga | H04N 21/4788 |
| 2017/0337366 A1* | 11/2017 | Lu | G06F 21/32 |
| 2018/0182390 A1* | 6/2018 | Hughes | G10L 15/22 |
| 2018/0294965 A1* | 10/2018 | Yan | H04L 9/006 |
| 2019/0156002 A1* | 5/2019 | Liu | G10L 17/04 |
| 2019/0156824 A1* | 5/2019 | Maeda | G10L 15/22 |
| 2019/0156825 A1* | 5/2019 | Shiga | G10L 15/30 |
| 2019/0272831 A1* | 9/2019 | Kajarekar | G10L 15/22 |
| 2019/0362405 A1* | 11/2019 | Stone | G06V 20/46 |
| 2020/0034521 A1* | 1/2020 | Teng | H04L 9/3213 |
| 2020/0117781 A1* | 4/2020 | Korus | G06N 20/00 |
| 2020/0143186 A1* | 5/2020 | Kato | G06V 40/20 |
| 2020/0265838 A1* | 8/2020 | Lee | G06F 3/167 |
| 2020/0286484 A1* | 9/2020 | Scanlon | G06F 3/167 |
| 2020/0311393 A1* | 10/2020 | Kutsuzawa | G06V 40/176 |
| 2021/0004618 A1* | 1/2021 | Qin | G06N 3/0454 |
| 2021/0004619 A1* | 1/2021 | Qin | G06V 10/40 |
| 2021/0027760 A1* | 1/2021 | Kainuma | G10L 13/10 |
| 2021/0056331 A1* | 2/2021 | Sakuma | G06V 20/597 |
| 2021/0104221 A1* | 4/2021 | Sharifi | G10L 13/086 |
| 2021/0165827 A1* | 6/2021 | Li | G06F 16/683 |
| 2021/0385074 A1* | 12/2021 | Adachi | H04W 4/023 |
| 2022/0084529 A1* | 3/2022 | He | G10L 15/22 |

* cited by examiner

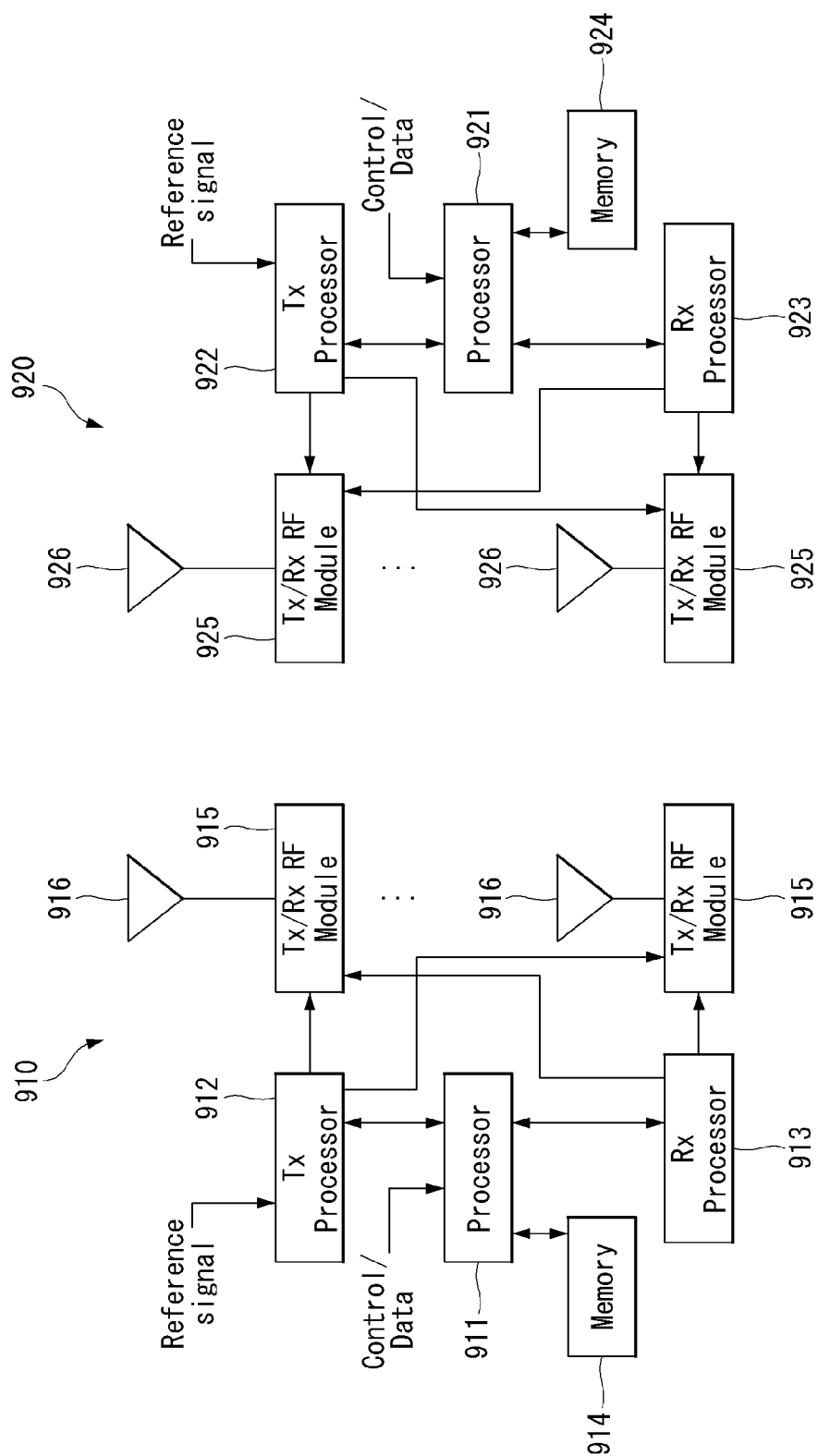
[FIG. 1]

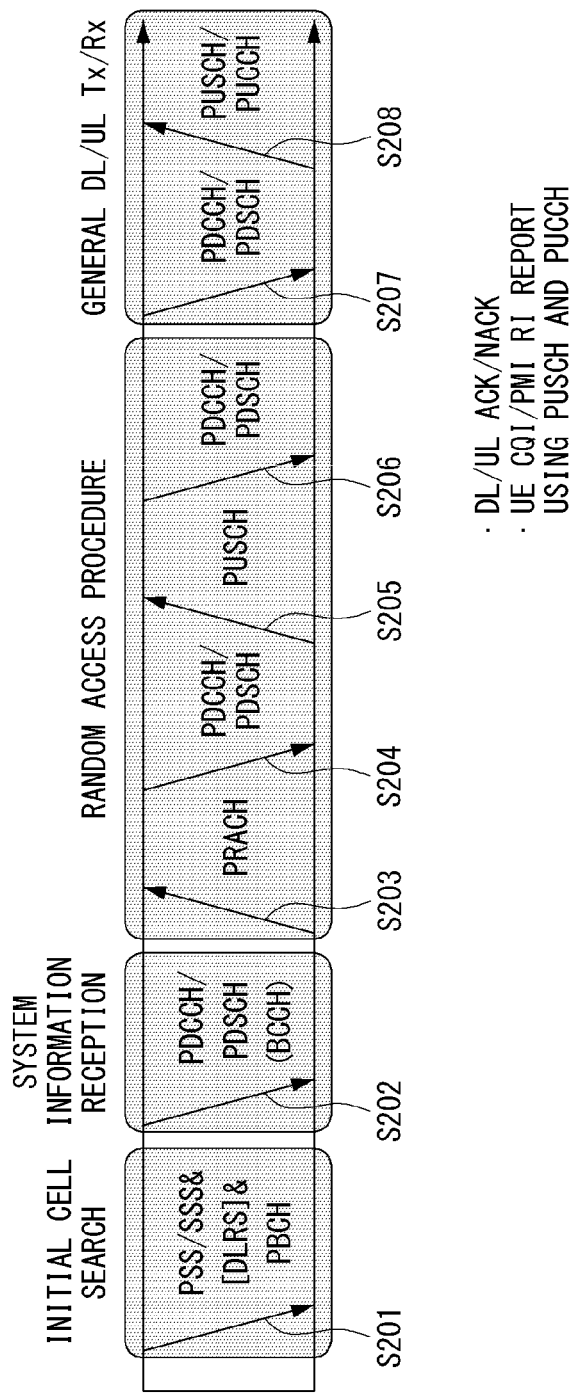
[FIG. 2]

[FIG. 3]
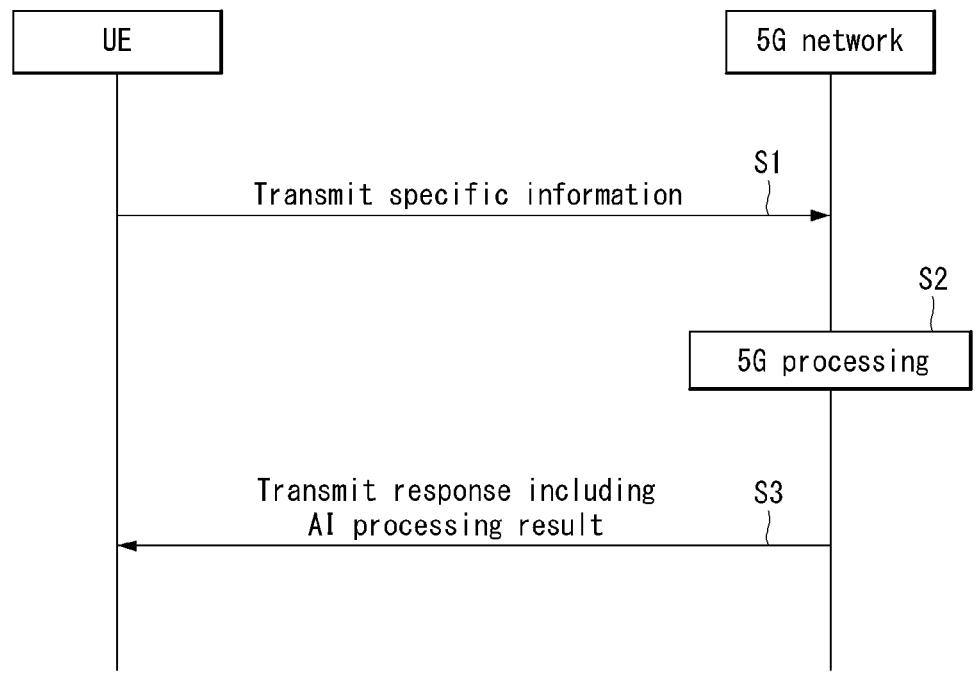

[FIG. 4]
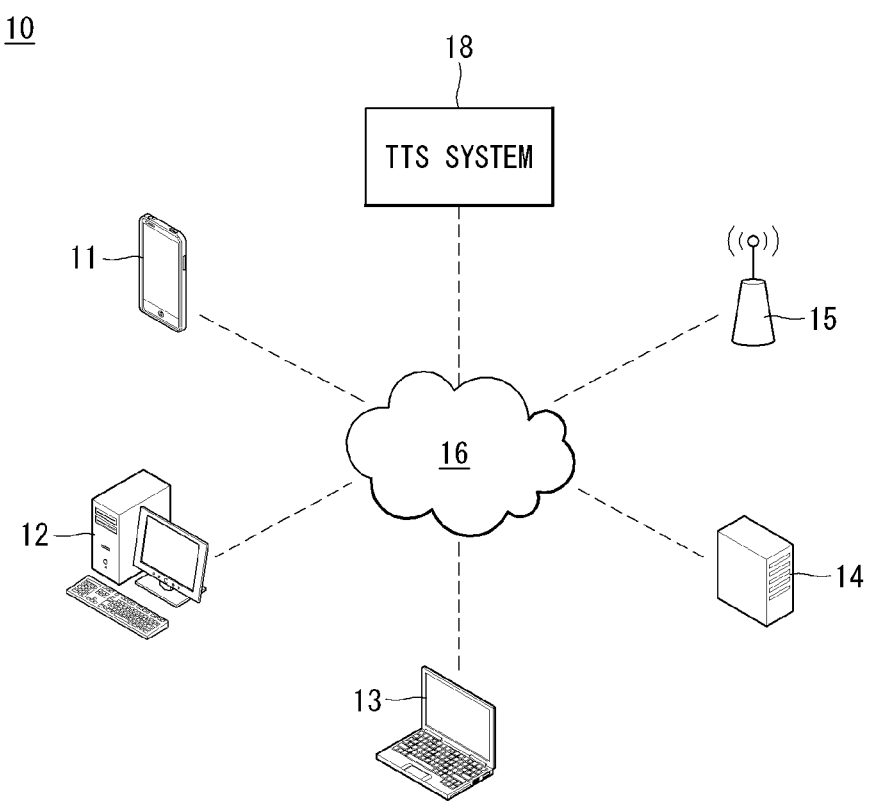

[FIG. 5]
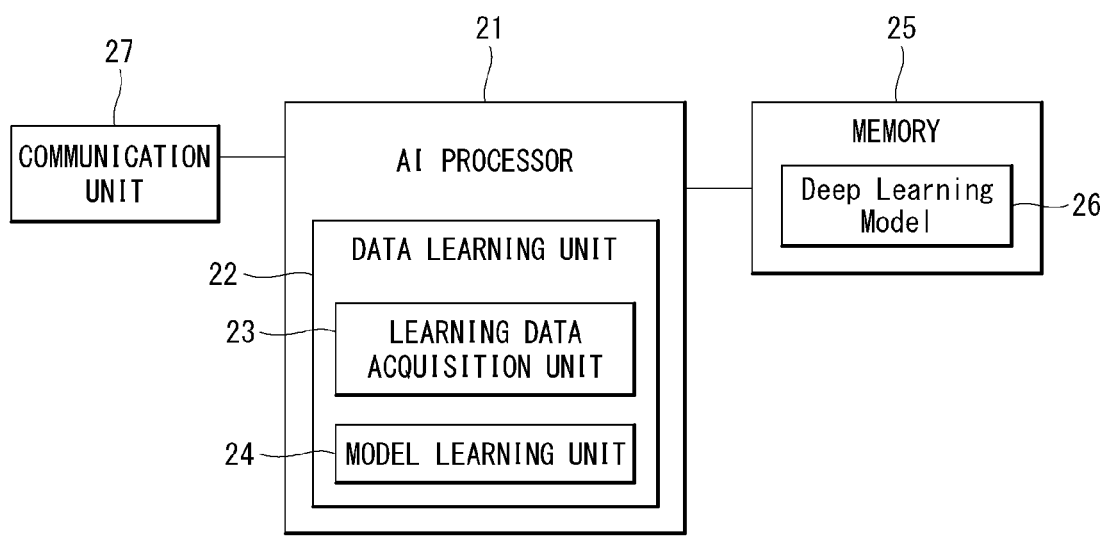

[FIG. 6]
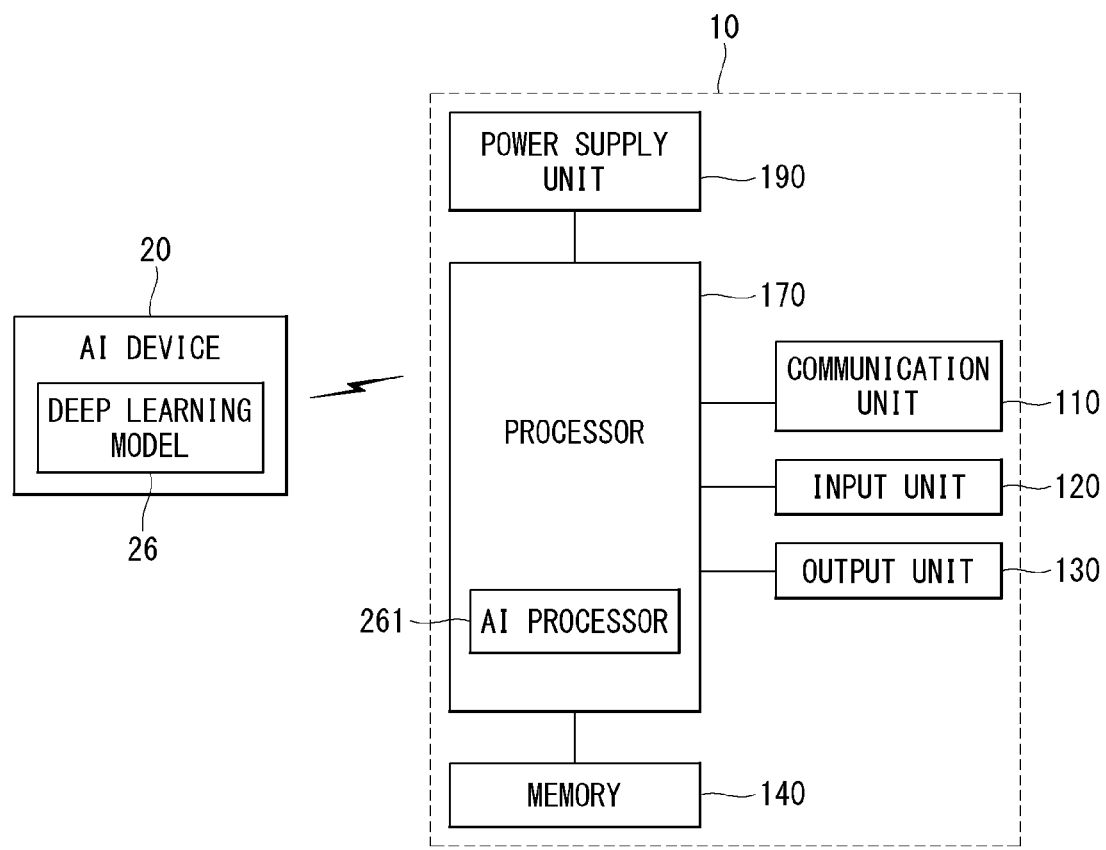

[FIG. 7]
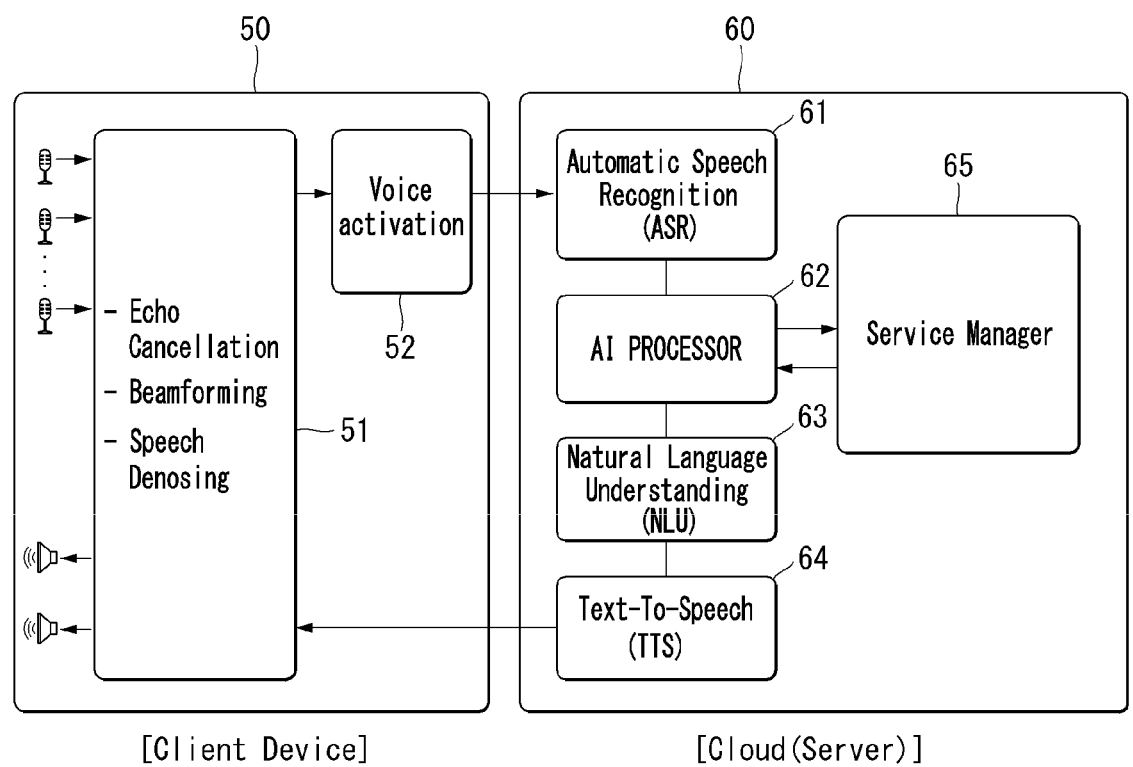

[FIG. 8]
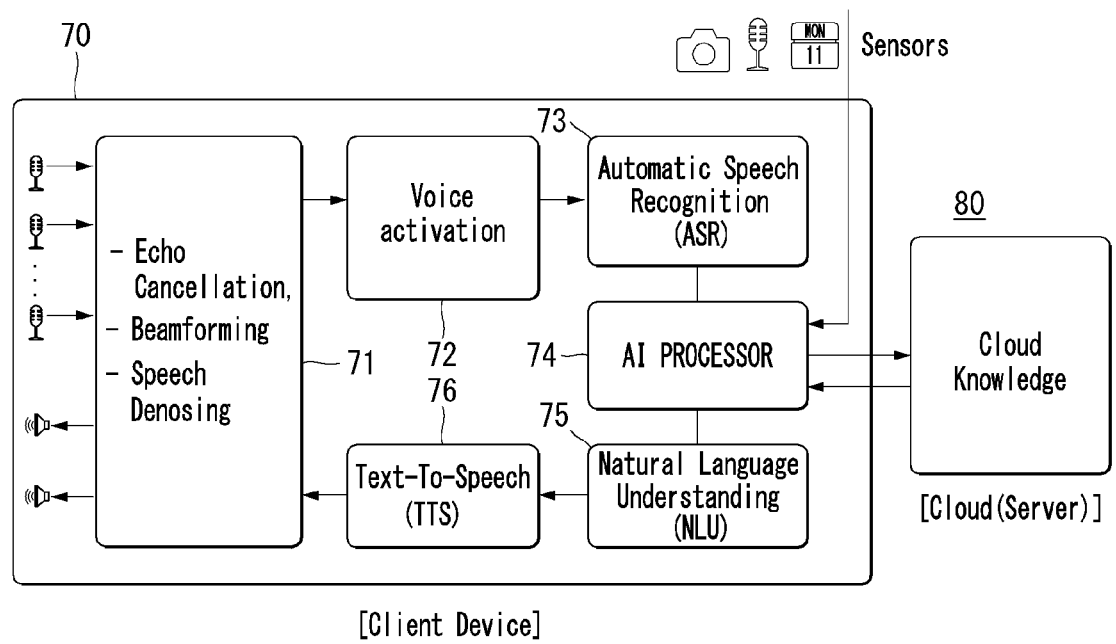

[FIG. 9]
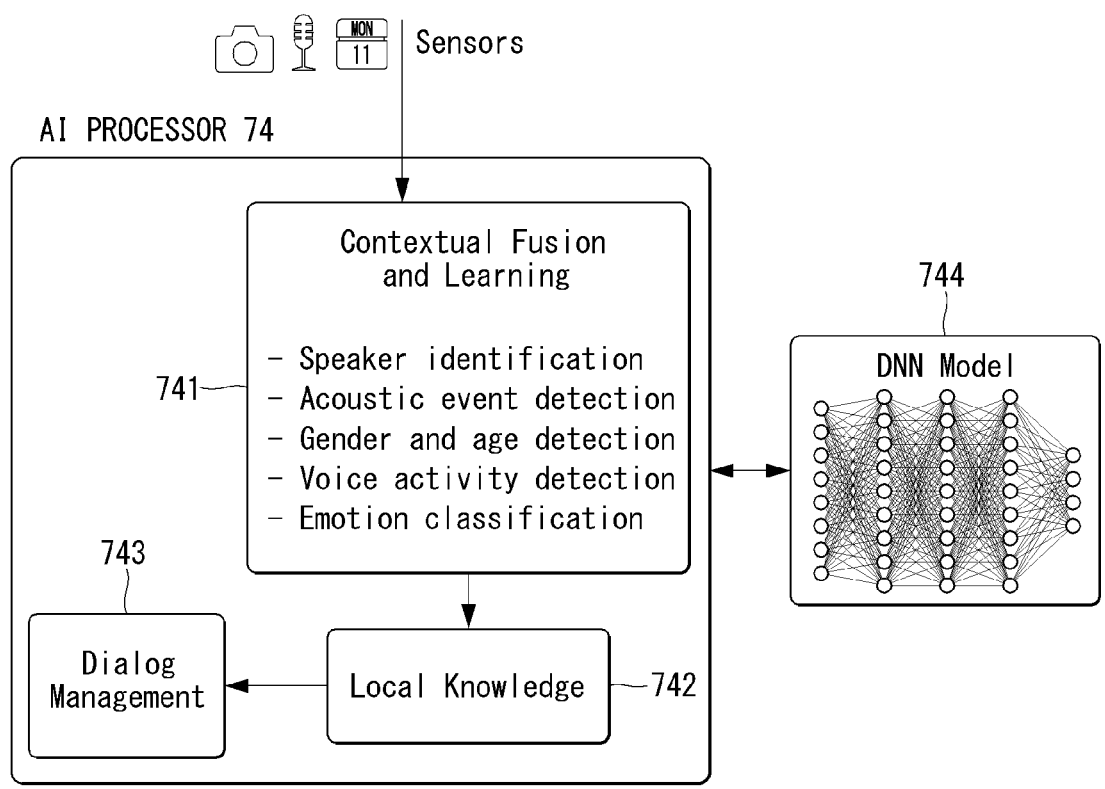

[FIG. 10]
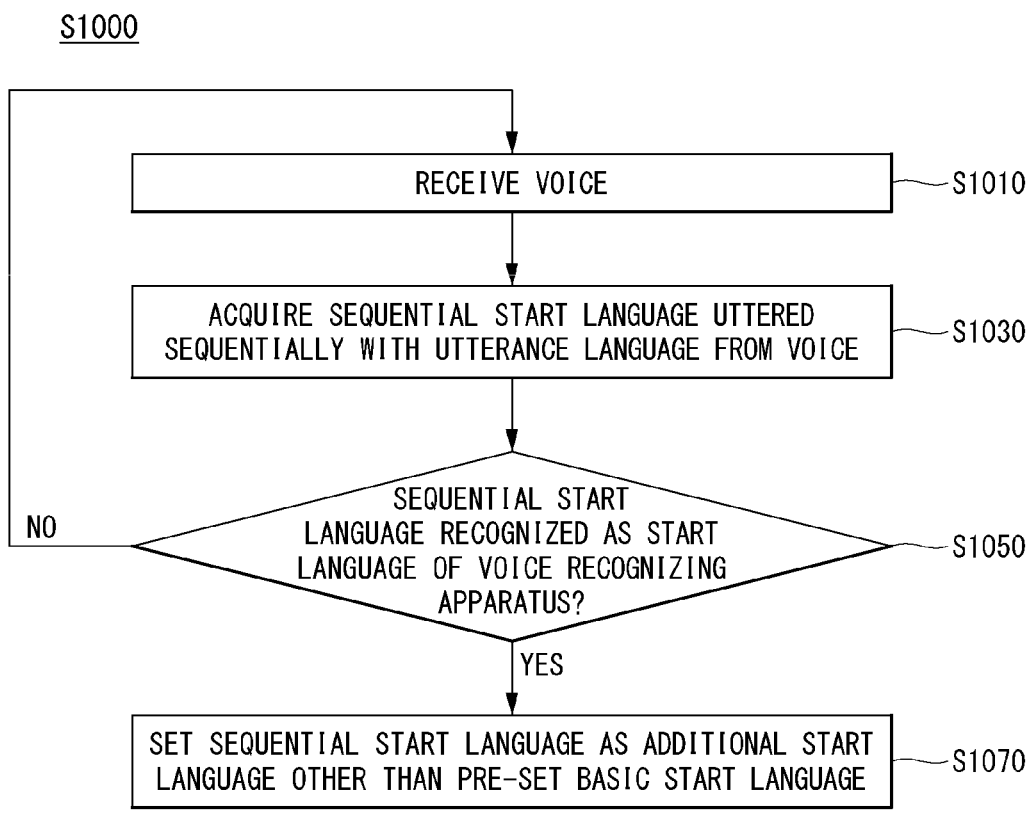

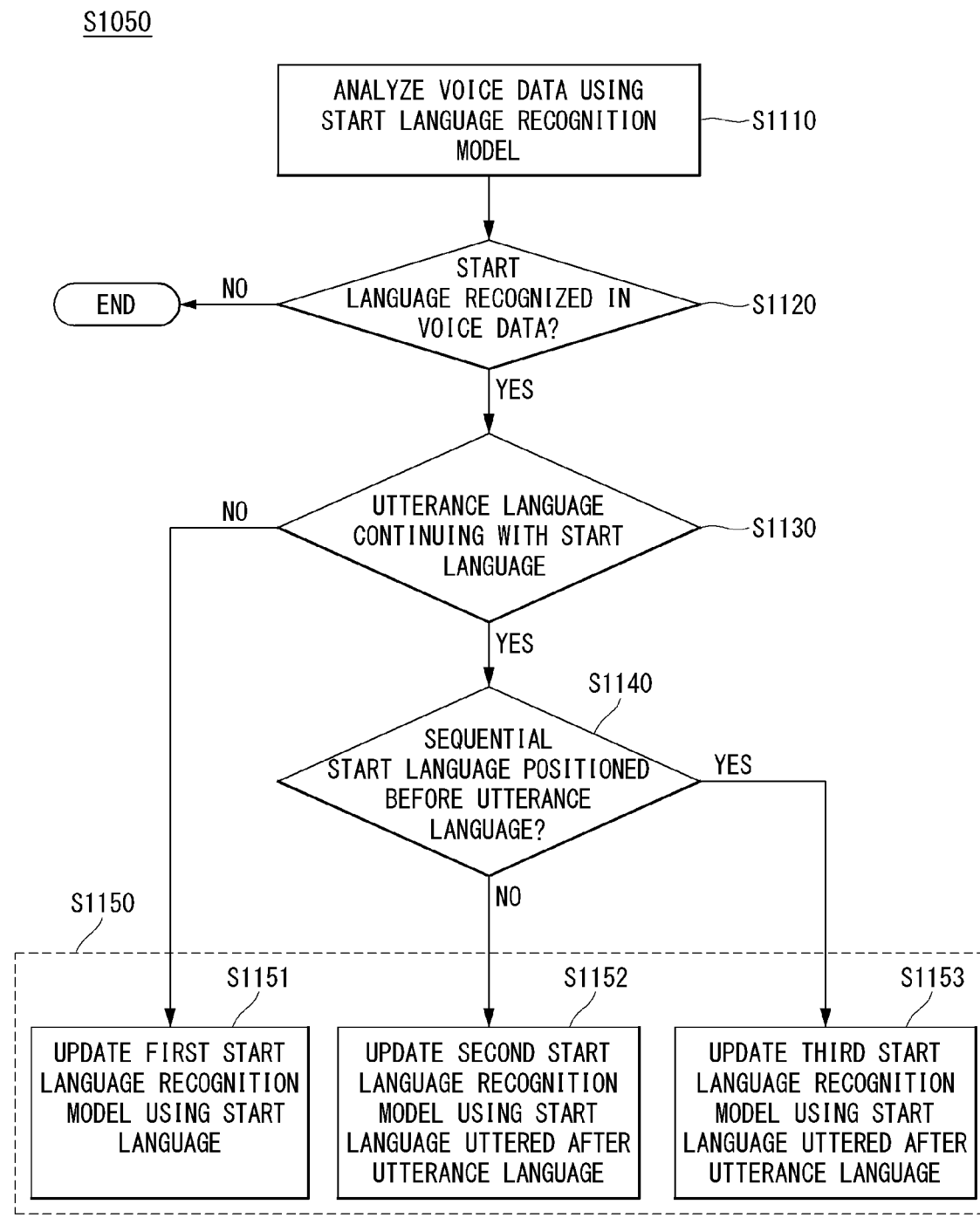
[FIG. 11]

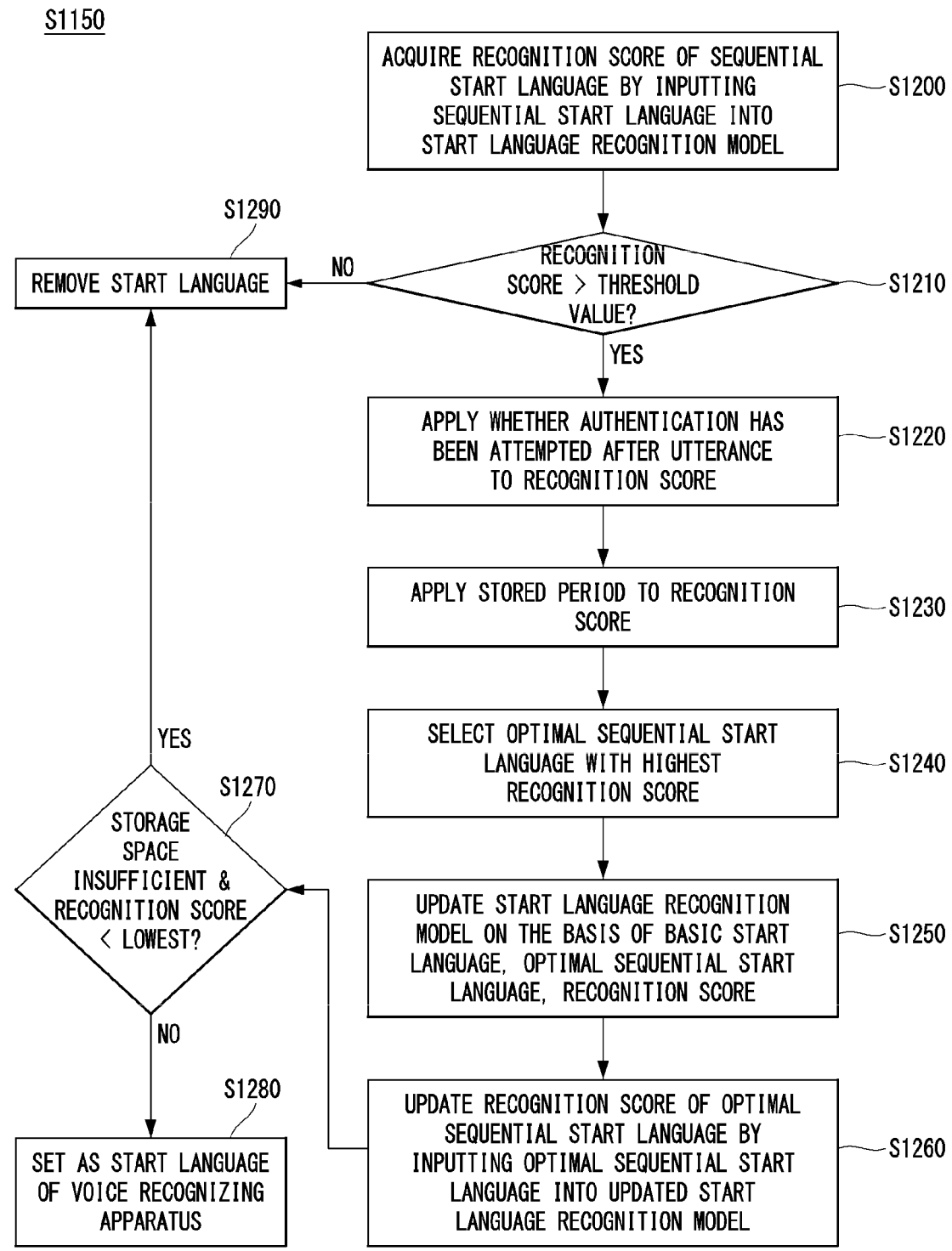
[FIG. 12]

[FIG. 13]
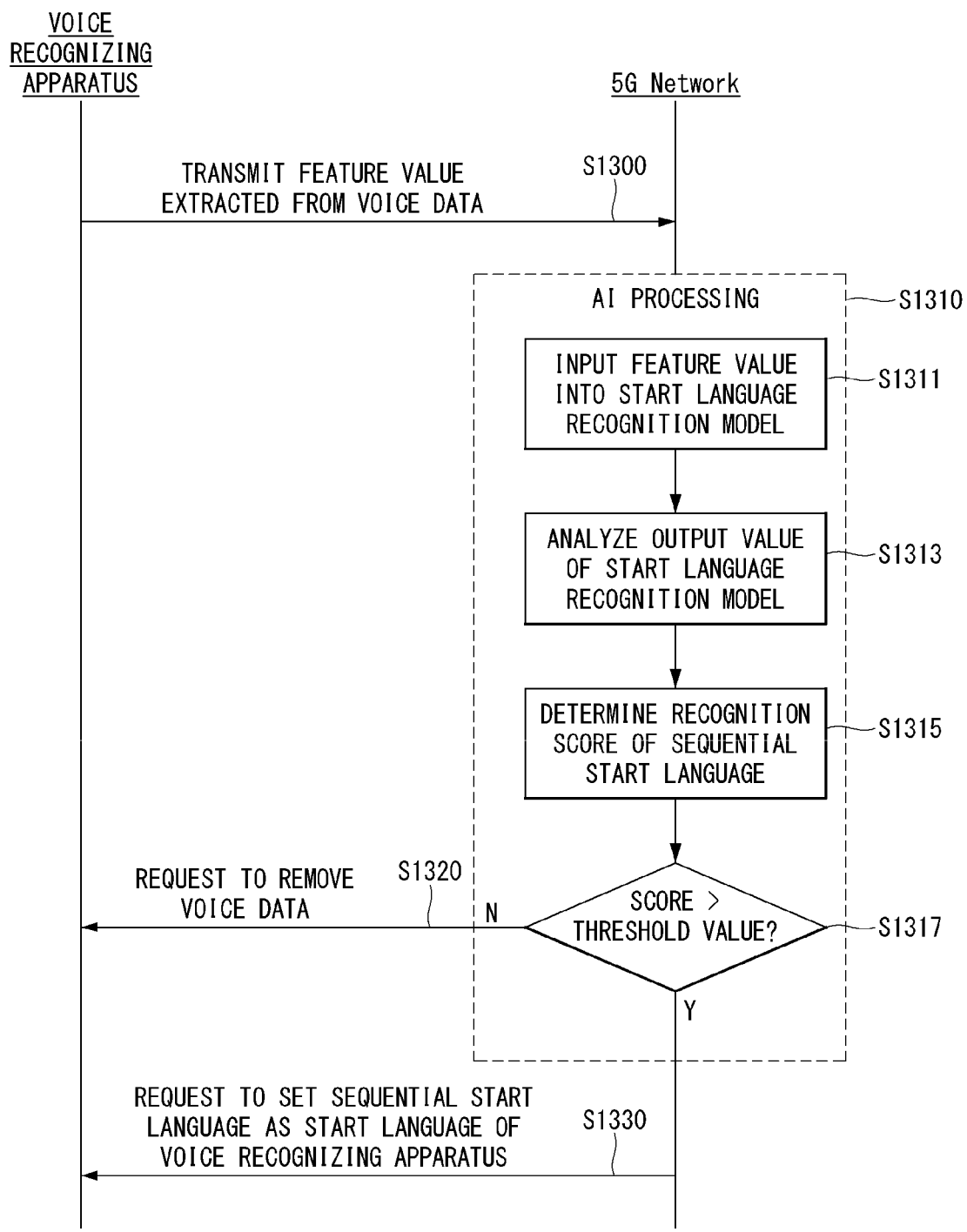

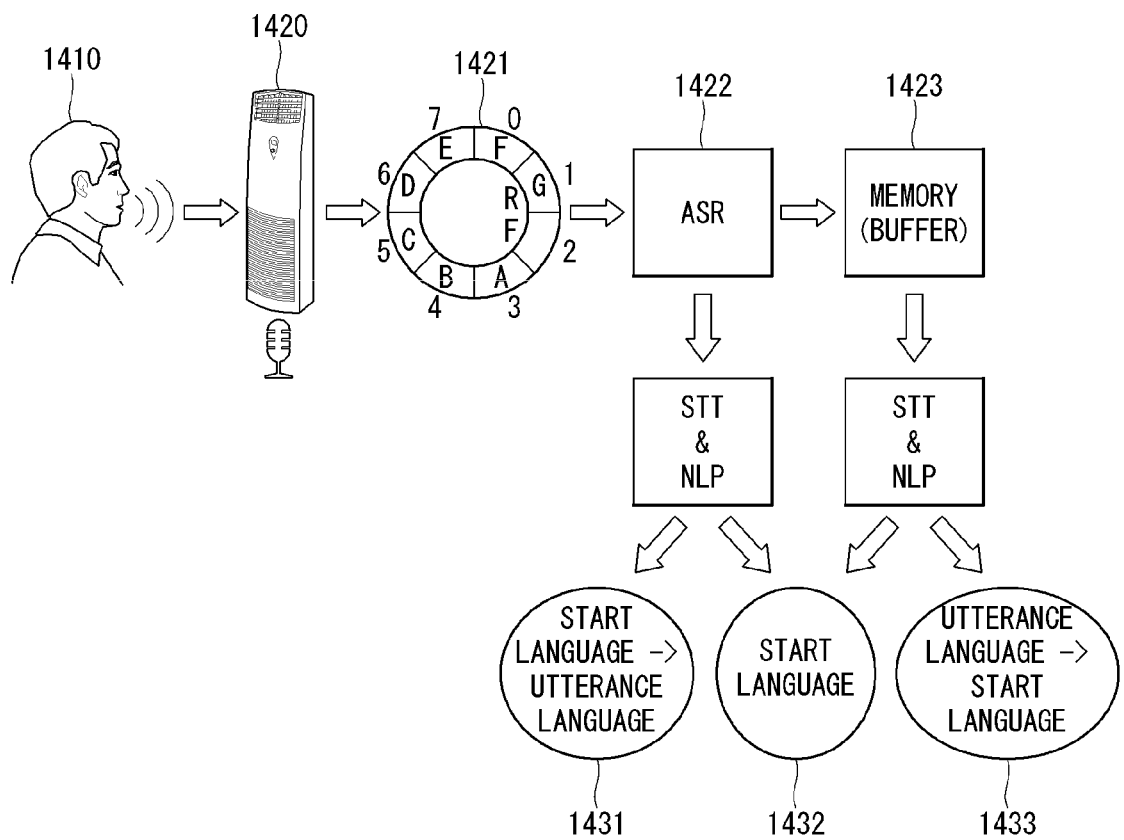
[FIG. 14]

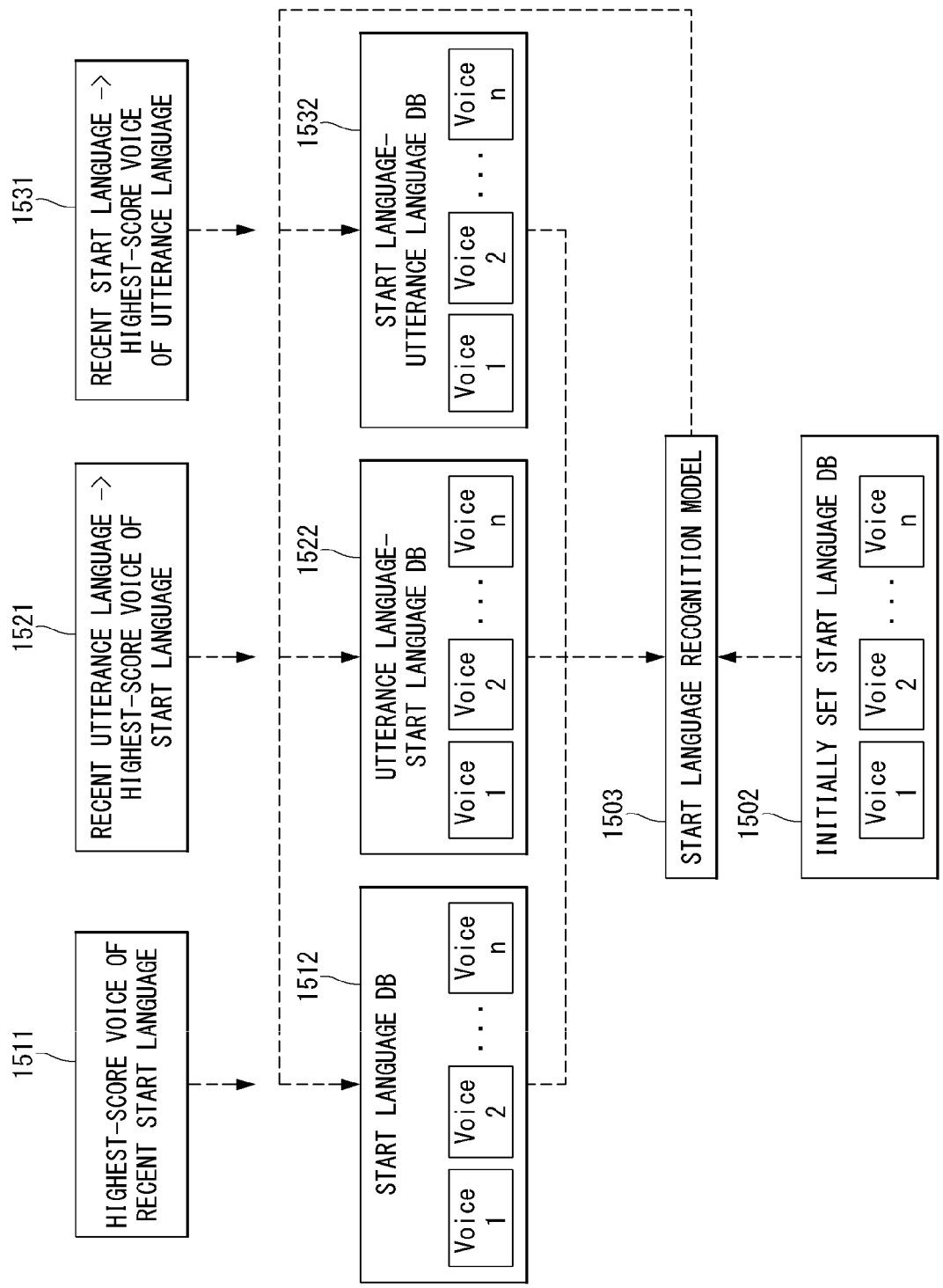
[FIG. 15]

[FIG. 16]
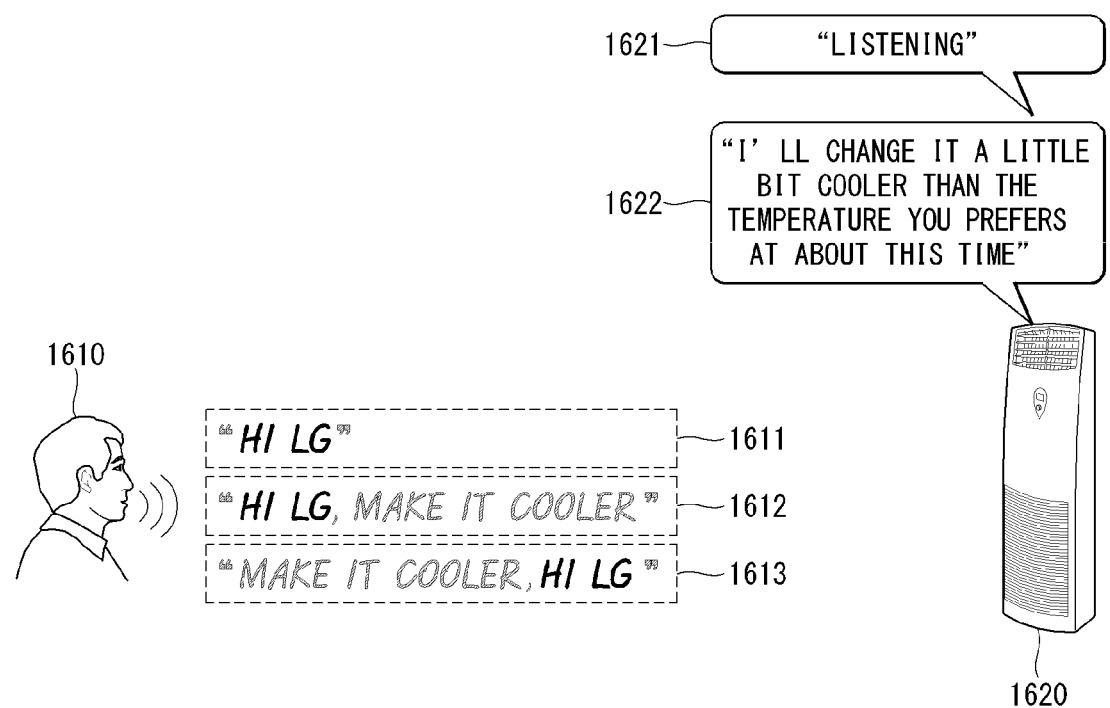

INTELLIGENT VOICE RECOGNIZING METHOD, APPARATUS, AND INTELLIGENT COMPUTING DEVICE

CROSS-REFERENCE TO RELATED APPLICATION(S)

This application is based on and claims priority under 35 U.S.C. 119 to Korean Patent Application No. 10-2019-0086309, filed on Jul. 17, 2019, in the Korean Intellectual Property Office, the disclosure of which is herein incorporated by reference in its entirety.

BACKGROUND OF THE INVENTION

Field of the Invention

The present disclosure relates to an intelligent voice recognizing method, apparatus, and intelligent computing device, and more specifically, to an intelligent voice recognizing method, apparatus, and intelligent computing device for recognizing user's voice.

Related Art

Recently, technologies of recognizing voices (utterance) of users have been developed.

A voice recognizing apparatus is an apparatus that recognizes voices from utterance of a user. Voice recognizing apparatuses can receive a voice signal from received utterance of a user and can recognize a voice or a message included in the voice by analyzing the received voice signal.

By contribution of development of a voice recognition-related technology and a home IoT (Internet of Things)-related technology (e.g., a 5G communication technology), a user enrollment procedure for recognizing a user is necessary before using IoT devices.

Meanwhile, the user enrollment procedure acquires a start language including only a start message from a user and enrolls the user who uttered the start language on a voice recognition apparatus using only the start language. However, in real situations, users say not only a start language, but also an utterance language (command) together (sequentially).

As described above, in seamless scheme speaking in which a start language and an utterance language are uttered together, a vocalization difference is generated in the start language part in comparison to a case when only a start language is uttered. Further, even in the same seamless scheme utterance, a vocalization difference is similarly generated when a start language is followed by an utterance language and when a start language follows an utterance language.

That is, when a start language of a user is called, vocalization of the user becomes difference in accordance with the position of the start language in a voice signal. Accordingly, a voice recognizing apparatus may not recognize an actual utterance language that is different in vocalization from a start language enrolled in advance.

SUMMARY OF THE INVENTION

The present disclosure aims to address the foregoing issues and/or needs.

Further, an object of the present disclosure is to implement a voice recognizing apparatus that can use even a seamless scheme start language by using a voice signal in which a start language continues with a continuous language as an enrolled voice.

A method in which a voice recognizing apparatus according to an embodiment of the present disclosure intelligently recognizes a voice, includes: receiving a voice; and starting the voice recognizing apparatus when a basic start language pre-set as a start language of the voice recognizing apparatus is recognized from the voice, in which the starting includes: acquiring a sequential start language sequentially uttered with an utterance language from the voice; and setting the sequential start language as an additional start language that can start the voice recognizing apparatus other than the basic start language when the sequential start language is recognized as a start language of the voice recognizing apparatus.

The starting can include determining whether the sequential start language is recognized as a start language of the voice recognizing apparatus, using a start language recognition model learned on the basis of the basic start language; and updating the start language recognition model on the basis of the sequential start language when the sequential start language is recognized as a start language of the voice recognizing apparatus.

The determining of whether the sequential start language is recognized as a start language of the voice recognizing apparatus may perform determination on the basis of a start language recognition score including information related to similarity between the sequential start language acquired using the start language recognition model and the basic start language.

The determining of whether the sequential start language is recognized as a start language of the voice recognizing apparatus may apply whether an authentication attempt to the voice recognizing apparatus is sensed before a threshold time passes after the voice is received, to the start language recognition score.

The determining of whether the sequential start language is recognized as a start language of the voice recognizing apparatus may apply a time that has passed after the voice was received to the start language recognition score.

The method may further include: acquiring a following start language uttered sequentially with an utterance language after the sequential start language is uttered; determining a start language recognition score related to the following start language; and removing one start language of the sequential start language and the following start language on the basis of a start language recognition score of the following start language and a start language recognition score of the sequential start language.

The updating of the start language recognition model may include: updating the start language recognition model using the start language recognition score of the sequential start language and the sequential start language; updating the start language recognition score of the sequential start language using the updated start language recognition model; an pre-determining whether the sequential start language is recognized as a start language of the voice recognizing apparatus on the basis of the updated start language recognition score.

The determining of whether the sequential start language is recognized as a start language of the voice recognizing apparatus may perform determination on the basis of storing orders of the utterance language and the sequential start language.

The determining of whether the sequential start language is recognized as a start language of the voice recognizing apparatus may include: putting the sequential start language into a first sequential start language list when data of the sequential start language is stored earlier than the utterance language; putting the sequential start language into a second sequential start language list when data of the sequential start language is stored later than the utterance language; and determining whether a first sequential start language of the first sequential start language list and a second sequential start language of the second sequential start language list are recognized as start languages of the voice recognizing apparatus, using different start language recognition models learned on the basis of different basic start languages.

The method may further include: receiving DCI (Downlink Control Information), which is used to schedule transmission of data of the voice acquired from an input unit of the voice recognizing apparatus, from a network; and transmitting the voice data to the network on the basis of the DCI.

The method may further include: performing an initial access procedure to the network on the basis of an SSB (Synchronization signal block); and transmitting the voice data to the network through a PUSCH, in which the SSB and a DM-RS of the PUSCH may be QCL with respect to a QCL type D.

The method may further include: controlling a communication unit to transmit the voice data to an AI processor included in the network; and controlling the communication unit to receive AI-processed information from the AI processor, in which the AI processed information may be information that has determined whether the sequential start language recognized from the voice data is recognized as a start language of the voice recognizing apparatus.

A voice recognizing apparatus that intelligently recognizes a voice includes: an input unit that receives a voice; and a processor that starts the voice recognizing apparatus when a basic start language pre-set as a start language of the voice recognizing apparatus is recognized from the voice, in which the processor: acquires a sequential start language sequentially uttered with an utterance language from the voice; and sets the sequential start language as an additional start language that can start the voice recognizing apparatus other than the basic start language when the sequential start language is recognized as a start language of the voice recognizing apparatus.

The processor can determine whether the sequential start language is recognized as a start language of the voice recognizing apparatus, using a start language recognition model learned on the basis of the basic start language; and update the start language recognition model on the basis of the sequential start language when the sequential start language is recognized as a start language of the voice recognizing apparatus.

The processor may determine whether the sequential start language is recognized as a start language of the voice recognizing apparatus on the basis of a start language recognition score including information related to similarity between the sequential start language acquired using the start language recognition model and the basic start language.

The processor may apply whether an authentication attempt to the voice recognizing apparatus is sensed before a threshold time passes after the voice is received, to the start language recognition score.

The processor may apply a time that has passed after the voice was received to the start language recognition score.

The processor may: acquire a following start language uttered sequentially with an utterance language after the sequential start language is uttered, through the input unit; determine a start language recognition score related to the following start language; and remove one start language of the sequential start language and the following start language on the basis of a start language recognition score of the following start language and a start language recognition score of the sequential start language.

The processor may: update the start language recognition model using the start language recognition score of the sequential start language and the sequential start language; update the start language recognition score of the sequential start language using the updated start language recognition model; and pre-determines whether the sequential start language is recognized as a start language of the voice recognizing apparatus on the basis of the updated start language recognition score.

The processor may determine whether the sequential start language is recognized as a start language of the voice recognizing apparatus on the basis of storing orders of the utterance language and the sequential start language.

The processor may: put the sequential start language into a first sequential start language list when data of the sequential start language is stored earlier than the utterance language; put the sequential start language into a second sequential start language list when data of the sequential start language is stored later than the utterance language; and determine whether a first sequential start language of the first sequential start language list and a second sequential start language of the second sequential start language list are recognized as start languages of the voice recognizing apparatus, using different start language recognition models learned on the basis of different basic start languages.

The voice recognizing apparatus may further include a communication unit, in which the processor may: receive DCI (Downlink Control Information), which is used to schedule transmission of data of the voice acquired from the input unit, from a network through the communication unit; and transmit the voice data to the network through the communication unit on the basis of the DCI.

The processor may: perform an initial access procedure to the network on the basis of an SSB (Synchronization signal block) through the communication unit; and transmit the voice data to the network through a PUSCH, and the SSB and a DM-RS of the PUSCH may be QCL with respect to a QCL type D.

The processor may: transmit the voice data to an AI processor included in the network through the communication unit; and receive AI-processed information from the AI processor, and the AI processed information may be information that has determined whether the sequential start language recognized from the voice data is recognized as a start language of the voice recognizing apparatus.

A non-transitory computer-readable recording medium according to another embodiment of the present disclosure is a non-transitory computer-readable recording medium in which a computer-executable component configured to be executed in one or more processors of a computing device, in which the computer-executable component: receives a voice; starts the voice recognizing apparatus when a basic start language pre-set as a start language of the voice recognizing apparatus is recognized from the voice; acquires a sequential start language sequentially uttered with an utterance language from the voice; and sets the sequential start language as an additional start language that can start the voice recognizing apparatus other than the basic start language when the sequential start language is recognized as a start language of the voice recognizing apparatus.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein:

FIG. 1 shows a block diagram of a wireless communication system to which methods proposed in the disclosure are applicable.

FIG. 2 shows an example of a signal transmission/reception method in a wireless communication system.

FIG. 3 shows an example of basic operations of an user equipment and a 5G network in a 5G communication system.

FIG. 4 shows an example of a block configuration diagram of a schematic system in which a voice recognizing method according to an embodiment of the present disclosure is implemented.

FIG. 5 shows a block diagram of an AI device that may be applied to one embodiment of the present disclosure.

FIG. 6 is an exemplary block diagram of a voice recognizing apparatus according to an embodiment of the present disclosure.

FIG. 7 shows a schematic block diagram of a speech synthesis apparatus in a speech synthesis system environment according to an embodiment of the present disclosure.

FIG. 8 shows a schematic block diagram of a speech synthesis apparatus in a speech synthesis system environment according to another embodiment of the present disclosure.

FIG. 9 shows a schematic block diagram of an intelligent processor that can implement start language recognition in accordance with an embodiment of the present disclosure.

FIG. 10 is a flowchart showing a voice recognizing method of a voice recognizing apparatus according to an embodiment of the present disclosure.

FIG. 11 is a flowchart showing a detailed process of a start language recognition step (S1050) of FIG. 10.

FIG. 12 is a flowchart showing a detailed process of a step of updating a start language recognition model (S1150) of FIG. 11.

FIG. 13 is a flowchart showing a process of performing a recognition store acquisition step (S1200) of FIG. 12 through a 5G network.

FIG. 14 shows a process of recognizing an utterance language and a start language in voice data.

FIG. 15 shows a process of generating and managing a first, second, and third start language lists.

FIG. 16 shows an intuitional voice recognition process using a sequential start language according to an embodiment of the present disclosure.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and obtain information such as a cell ID. In LTE and NR systems, the P-SCH and S-SCH are respectively called a primary synchronization signal (PSS) and a secondary synchronization signal (SSS). After initial cell search, the UE can obtain broadcast information in the cell by receiving a physical broadcast channel (PBCH) from the BS. Further, the UE can receive a downlink reference signal (DL RS) in the initial cell search step to check a downlink channel state. After initial cell search, the UE can obtain more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE obtains time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/obtained through an SSS of the cell, and information on the cell ID among 336 cell ID groups is provided/obtained through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can obtain UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof.

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to "beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Processing Using 5G Communication

FIG. 3 shows an example of basic operations of AI processing in a 5G communication system.

The UE transmits specific information to the 5G network (S1). The 5G network may perform 5G processing related to the specific information (S2). Here, the 5G processing may include AI processing. And the 5G network may transmit response including AI processing result to UE(S3).

G. Applied Operations between UE and 5G Network in 5G Communication System

Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to obtain DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

FIG. 4 shows an example of a block configuration diagram of a schematic system in which a voice recognizing method according to an embodiment of the present disclosure is implemented.

Referring to FIG. 4, a system in which a voice recognizing method according to an embodiment of the present disclosure is implemented may include a voice recognizing apparatus 10, a network system 16, and a TTS (Text-To-Speech) system 18 that is a speech synthesis engine.

At least one voice recognizing apparatus 10 may include a mobile phone 11, a PC 12, a notebook computer 13, and other server devices 14. The PC 12 and the notebook computer 13 may be connected to at least one network system 16 through a wireless access point 15. According to an embodiment of the present disclosure, the voice recognizing apparatus 10 may include an audio book and a smart speaker.

Meanwhile, the TTS system 18 may be implemented in a server included in a network and may be implemented through on-device processing and embedded in the voice recognizing apparatus 10. An embodiment of the present disclosure is described on the assumption that the TTS system 18 is disposed and implemented in the voice recognizing apparatus 10.

FIG. 5 shows a block diagram of an AI device that may be applied to one embodiment of the present disclosure.

The AI device 20 may include an electronic device including an AI module capable of performing AI processing or a server including the AI module. In addition, the AI device 20 may be included in at least a part of the voice recognizing apparatus 10 illustrated in FIG. 4 and may be provided to perform at least some of the AI processing together.

The AI processing may include all operations related to voice recognition of the voice recognizing apparatus 10 shown in FIG. 5. For example, the AI processing may be a process of acquiring information related to a recognition score showing the degree of recognition as a start language of the voice recognizing apparatus by analyzing voice data of the voice recognizing apparatus 10. Further, the AI processing can provide whether a sequential start language of voice data is recognized as a start language of the voice recognizing apparatus to a user by analyzing the voice data of the voice recognizing apparatus 10.

The AI device 20 may include an AI processor 21, a memory 25, and/or a communication unit 27.

The AI device 20 is a computing device capable of learning neural networks, and may be implemented as various electronic devices such as a server, a desktop PC, a notebook PC, a tablet PC, and the like.

The AI processor 21 may learn a neural network using a program stored in the memory 25.

In particular, the AI processor can learn a neural network for recognizing a recognition score for a sequential start language in a voice by analyzing voice data. Further, the AI processor 21 can learn a neural network for recognizing a basic start language set in advance in a voice by analyzing voice data. Here, the neural network for recognizing a basic start language set in advance may be designed to simulate the brain structure of human on a computer and may include a plurality of network nodes having weights and simulating the neurons of human neural network.

The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice output, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present disclosure.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by obtaining learning data to be used for learning and by applying the obtained learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquisition unit 23 and a model learning unit 24.

The learning data acquisition unit 23 can acquire learning data required for a neural network model for classifying and recognizing data. For example, the learning data acquisition unit 23 can acquire, as learning data, voice data and/or basic start language data to be input to a neural network model.

The learning data acquisition unit 23 may obtain training data for a neural network model for classifying and recognizing data. For example, the learning data acquisition unit 23 may obtain microphone detection signal to be input to the neural network model and/or a feature value, extracted from the message, as the training data.

The model learning unit 24 can perform learning such that a neural network model has a determination reference about how to classify predetermined data, using the obtained learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data preprocessor may pre-process an obtained operating state so that the obtained operating state may be used for training for recognizing estimated noise information. For example, the learning data preprocessor may process an obtained operating state in a preset format so that the model training unit 24 may use obtained training data for training for recognizing estimated noise information.

Furthermore, the training data selection unit may select data for training among training data obtained by the learning data acquisition unit 23 or training data pre-processed by the preprocessor. The selected training data may be provided to the model training unit 24. For example, the training data selection unit may select only data for a syllable, included in a specific region, as training data by detecting the specific region in the feature values of an operating state obtained by the voice output device 10.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Here, the external electronic device may be defined as an autonomous vehicle. Further, the AI device 20 may be defined as another vehicle or a 5G network that communicates with the autonomous vehicle. Meanwhile, the AI device 20 may be implemented by being functionally embedded in an autonomous module included in a vehicle. Further, the 5G network may include a server or a module that performs control related to autonomous driving.

Meanwhile, the AI device 20 shown in FIG. 5 was functionally separately described into the AI processor 21, the memory 25, the communication unit 27, etc., but it should be noted that the aforementioned components may be integrated in one module and referred to as an AI module.

FIG. 6 is an exemplary block diagram of a voice recognizing apparatus according to an embodiment of the present disclosure.

The voice recognizing apparatus 10 (TTS device) shown in FIG. 6 may include an output unit 130 for outputting a voice processed by the voice recognizing apparatus 10 or another apparatus.

FIG. 6 discloses a voice recognizing apparatus 10 (TTS device) for performing voice recognition. An embodiment of the present disclosure may include computer-readable and computer-executable instructions that can be included in the voice recognizing apparatus 10. Although FIG. 6 discloses a plurality of components included in the voice recognizing apparatus 10, components not disclosed in the figure may also be included in the voice recognizing apparatus 10.

Meanwhile, some components disclosed in voice recognizing apparatus 10 are single components may be shown several times in one apparatus. For example, the voice recognizing apparatus 10 may include a communication unit 110, an input unit 120, an output unit 130, a memory 140, a power supply unit 190, and/or a processor 170.

A plurality of voice recognizing apparatuses may be applied to one voice recognizing apparatus. In such as a multi-apparatus system, the voice recognizing apparatus may include different components for performing various aspects of a voice recognition process. The voice recognizing apparatus 10 shown in FIG. 6 is an example, and may be an independent apparatus and may be implemented as a component of a larger apparatus or system.

An embodiment of the present disclosure may be applied to a plurality of different apparatuses and computer systems, for example, a common computing system, a server-client computing system, a telephone computing system, a laptop computer, a mobile terminal, a PDA, a tablet computer, etc. The voice recognizing apparatus 10 may be applied as a component of another apparatus or system that provides a voice recognition function such as automated-teller machines (ATM), kiosks, a global positioning system (GPS), home appliances (e.g., a refrigerator, an oven, and a laundry machine), vehicles, ebook readers, etc.

Referring to FIG. 6, the voice recognizing apparatus 10 shown in FIG. 6 may include an output unit 110 for outputting a voice processed by the voice recognizing apparatus 10 or another apparatus. The output unit 110 may include a speaker, a headphone, or another appropriate component that transmits a voice. The output unit 110 may be integrated with the voice recognizing apparatus 10 or may be implemented separately from the voice recognizing apparatus 10.

The voice recognizing apparatus 10 may include address/data buses (not shown) for transmitting data among components of the voice recognizing apparatus 10. The components in the voice recognizing apparatus 10 may be respectively directly connected with other components through the buses (not shown). The components in the voice recognizing apparatus 10 may be directly connected with the processor 170.

The voice recognizing apparatus 10 may include the processor 170. The processor 170 may correspond to a CPU for processing data, a computer-readable instruction processing data, and a memory for storing data and instructions. The memory 140 may include a volatile RAM, a nonvolatile ROM, or another type of memory.

The voice recognizing apparatus 10 may include the memory 140 for storing data and instructions. The memory 140 may include magnetic storage, optical storage, solid-state storage types, etc.

The voice recognizing apparatus 10 may be connected with a detachable or external memory (e.g., a separable memory card, a memory key drive, a network storage, etc.) through the input unit 120 or the output unit 130.

Computer instructions to be processed by the processor 170 for operating the voice recognizing apparatus 10 and various components can be executed by the processor 170 and can be stored in the memory 140, an external device, or a memory or storage included in the processor 170 to be described below. Alternatively, all or some of executable instructions may be added to software and stored in hardware or firmware. An embodiment of the present disclosure may be implemented by various combinations of, for example, software, firmware, and/or hardware.

The input unit 120 may include a microphone, a touch input unit, a keyboard, a mouse, a stylus, or another input unit.

The output unit 130 may include an audio output unit. The output unit 130 may include a display (visual display or tactile display), an audio speaker, a headphone, a printer, or another output unit. The input unit 120 and/or the output unit 130 may also include an interface for connection with external peripheral devices such as a USB (Universal Serial Bus), firmware, thunderbolt, or another connection protocol.

The input unit 120 and/or the output unit 130 may also include a network connection such as an Ethernet port, a modem, etc. A wireless communication device such as radio frequency (RF), infrared, Bluetooth, and wireless local area networks (WLAN) (Wi-Fi etc.) or a wireless network wireless apparatus such as a 5G network, an LTE (Long Term Evolution) network, a WiMAN network, and a 3G network may be included. The voice recognizing apparatus 10 may include an internet or distributed computing environment through the input unit 120 and/or the output unit 130.

The voice recognizing apparatus 10 may include the processor 170 for processing textual data and an audio waveform including a voice.

The processor 170 may be connected with a bus (not shown), the input unit 120, the output unit 130, and/or other components of the voice recognizing apparatus 10.

The source of the textual data may be data that have been generated by internal components of the voice recognizing apparatus 10. Further, the source of the textual data may be data that have been received from an input unit such as a keyboard or may be data that have been transmitted to the voice recognizing apparatus 10 through network connection. A text may be a text to be converted into speech by the processor or a sentence type including numbers and/or punctuations. An input text may also include a special annotation for processing by the processor 170 and can give an instruction saying how a specific text should be pronounced through the special annotation. The textual data can be processed in real time or can be stored and processed later.

The processor 170 may include a front end, a speech synthesis engine, and a TTS storage unit. The front-end can convert input textual data into symbolic linguistic representation for processing by the speech synthesis engine. The speech synthesis engine can convert an input text into a voice by comparing annotated phonetic units models with information stored in the TTS storage unit. The front-end and the speech synthesis engine may include an embedded internal processor or memory or may use the processor 170 and the memory 140 included in the voice recognizing apparatus 10. Instructions for operating the front-end and the speech synthesis engine may be included in the processor 170, the memory 140 of the voice recognizing apparatus 10, or an external device.

Text input to the processor 170 may be transmitted to the front-end for processing. The front-end 1710 may include a module for perform text normalization, linguistic analysis, and linguistic prosody generation.

The front-end converts numbers, abbreviations, and symbols to be the same as the written ones by processing text input and generating a standard text while performing the test normalization operation.

The front-end can generate a series of phonetic units corresponding to an input text by analyzing the language of a normalized text while performing the linguistic analysis operation. This process may be referred to as phonetic transcription. The phonetic units include symbol expression of sound units that are finally combined and output as speech by the voice recognizing apparatus 10. Various sound units may be used to separate a text for speech synthesis. The processor 170 can process a voice on the basis of phonemes (individual sounds), half-phonemes, di-phones (the last half of one phoneme combined with the front half of an adjacent phoneme), bi-phones (two continuous phonemes), syllables, words, phrases, sentences, or other units. Each word can be mapped to one or more phonetic units. Such mapping can be performed using a language dictionary stored in the voice recognizing apparatus 10.

The linguistic analysis that is performed by the front-end may also include a process of checking different grammatical elements such as prefixes, suffixes, phrases, punctuations, and syntactic boundaries. Such grammatical components can be used to make a natural audio waveform by the processor 170. The language dictionary may also include letter-to-sound rules, which can be used to pronounce words or character combinations that can be generated by the processor 170 and has not been known before, and other tools. In general, the more the information included in a language dictionary, the more the high-quality voice output can be secured.

On the basis of the language analysis, the front-end can perform linguistic prosody generation annotated with prosodic characteristics that show how the final sound unit should be pronounced in the final output voice.

The prosodic characteristics may also be referred to as acoustic features. While performing this step of operation, the front-end may be integrated with the processor 170 in consideration of certain prosodic annotations accompanied by text input. Such acoustic features may include pitch, energy, duration, etc. Applying the acoustic features may be based on prosodic models that the processor 170 can use. Such prosodic models show how phonetic units should be pronounced in a specific situation. For example, a prosodic model can consider a phoneme's position in a syllable, a syllable's position in a word, a word's position in a sentence or phrase, neighboring phonetic units, etc. Similar to the language dictionary, the more the information of the prosodic model, the more the high-quality voice output can be secured.

Output of the front-end may include a series of phonetic units annotated with prosodic characteristics. The output of the front-end may be referred to as symbolic linguistic representation. The symbolic linguistic representation can be transmitted to the speech synthesis engine. The speech synthesis engine performs a process of converting speech into an audio waveform to output it to a user through the audio output unit 110. The speech synthesis engine may be configured to convert an input text into high-quality natural voice in an efficient manner. Such high-quality speed may be configured to be pronounced as similar as possible to a human speaker.

The speech synthesis engine can perform speech synthesis using at least one or more different methods.

A unit selection engine compares a recorded speech database with symbolic linguistic representation generated by the front-end. The unit selection engine matches the symbolic linguistic representation with a speech audio unit of the speech database. Matching units are selected to make speech output and the selected matching units may be connected together. Each unit may include not only an audio waveform corresponding to a phonetic unit such as a short .wav file of a specific sound, but also other items of information such as a position where the phonetic unit is expressed in a word, a sentence, a phrase, and an adjacent phonetic unit, together with description of various sound characteristics associated with a .wav file (pitch, energy, etc.).

The unit selection engine can match input texts using all of the information in the unit database to generate a natural waveform. The unit database may include example of several phonetic units that provide different options to the voice recognizing apparatus 10 to connect units with speech. One of the advantages of unit selection is that natural voice output can be generated in accordance with the size of a database. Further, the larger the unit database, the more natural voice the voice recognizing apparatus 10 can configure.

Meanwhile, for the speech synthesis, a parameter synthesis method exist other than the unit selection synthesis. According to the parameter synthesis, synthesis parameters such as a frequency, a volume, and noise can be performed by a parameter synthesis engine, a digital signal processor, or another audio generation apparatus to generate an audio waveform.

The parameter synthesis can accord symbolic linguistic representation to a desired output voice parameter using an acoustic model and various statistic techniques. Parameter synthesis not only can process a voice, but also can perform accurate processing with a high processing speed even without a large-size database related to unit selection. The unit selection synthesis method and the parameter synthesis method are separately performed or performed together, thereby being able to generate voice audio output.

Parameter speech synthesis can be performed as follows. The processor 170 may include an acoustic model that can convert symbolic linguistic representation into a synthetic acoustic waveform of text input on the basis of an audio signal operation. The acoustic model may include rules that can be used by a parameter synthesis engine to assign specific audio waveform parameters to input phonetic units and/or prosodic annotations. The rules can be used to calculate a score that shows possibility that specific audio output parameters (a frequency, a volume, etc.) correspond to the part of input symbolic linguistic representation from the front-end.

A plurality of technologies may be applied to the parameter synthesis engine to match voices to be synthesized to an input phonetic unit and/or a prosodic annotation. One of general technologies uses an HMM (Hidden Markov Model). The HMM may be used to determine probability that audio output should be accorded to text input. The HMM can be used to convert parameters of linguistic and acoustic spaces into parameters to be used by a vocoder (digital voice encoder) to artificially synthesize voices.

The voice recognizing apparatus 10 may include a phonetic unit database to be used for unit selection.

The phonetic unit database may be stored in the memory 140 or another storage configuration. The phonetic unit database may include recorded speech vocalization. The speech vocalization may be a test corresponding to an utterance content. Further, the phonetic unit database may include a recorded voice (an audio wave, a feature vector, or another format type) having a considerable storing space in the voice recognizing apparatus 10. Unit samples of the phonetic unit database may be classified in various methods including a phonetic unit (a phoneme, a di-phone, a word, etc.), a linguistic prosodic label, an acoustic feature sequence, a human speaker identity, etc. Sample utterance may be used to generate a mathematical model corresponding to desired audio output for a specific phonetic unit.

The speech synthetic engine can select a unit, which is accorded the most close to an input text (including both of a phonetic unit and a prosodic symbol annotation), in the phonetic unit database when matching symbolized linguistic representation. In general, the larger the phonetic unit database, the larger the number of selectable sample units, so accurate speech output is possible.

Audio waveforms including voice output from the processor 170 can be transmitted to the output 110 to be output to a user. An audio waveform including a voice can be stored in a plurality of different formats such as a series of feature vectors, uncompressed audio data, or compressed audio data. For example, voice output can be encoded and/or compressed by an encoder/decoder before it is transmitted. The encoder/decoder can encode and decode audio data such as digitalized audio data, a feature data, etc. Further, the function of the encoder/decoder may be positioned in a separate component or may be obviously performed by the processor 170.

Meanwhile, the memory 140 can store different items of information for speech recognition.

The contents of the memory 140 may be prepared for general TTS use and may be customized to include sounds and words that may be used for specific applications. For example, the TTS storage 180 may include a customized voice specialized for position and navigation for TTS processing by a GPS.

Further, for example, the memory 140 may be customized to a user on the basis of individualized desired voice output. For example, a user may prefer an output voice to have specific sex, a specific intonation, a specific speed, a specific emotion (e.g., a happy voice). The speech synthesis engine may include a specialized database or model to explain such a user's preference.

The voice recognizing apparatus 10 may also be configured to perform TTS processing with multiple languages. For each language, the processor 170 may include data, instructions, and/or components specially configured to synthesize voices in desired languages.

In order to improve performance, the processor 170 can correct or update the contents of the memory 140 on the basis of feedback to a TTS processing result, so the processor 170 can improve speech recognition over the ability that is provided from a training corpus.

As the processing ability of the voice recognizing apparatus 10 is improved, it is possible to output a voice by reflecting an emotional property that an input text has. Alternatively, the voice recognizing apparatus 10 can output a voice by reflecting the intent (emotional information) of a user who wrote an input text even if an emotional property is not included in the input text.

Substantially, when a model to be integrated with a TTS module that performs TTS processing is constructed, the TTS system may integrate various components described above with another component. For example, the voice recognizing apparatus 10 may include a block for setting a human speaker.

A human speaker setting unit can set a human speaker for each character that shows up in a script. The human speaker setting unit may be integrated with the processor 170 or may be integrated as a part of the front-end or the speech synthesis engine. The human speaker setting unit synthesizes texts corresponding to a plurality of characters into voices of a set human speaker using metadata corresponding to the human speaker profile.

According to an embodiment of the present disclosure, as the metadata, a markup language may be used, and preferably, an SSML (Speech Synthesis Markup Language) may be used.

Hereafter, a voice processing process that is performed in a device environment and/or a cloud environment or server environment is described with reference to FIGS. 7 and 8.

FIG. 7 shows an example in which a device 50 can receive voice input, but a process of processing the input voices and synthesizing voices, that is, the entire operation of voice processing is performed in a cloud environment 60. On the contrary, FIG. 8 shows an example of on-device processing in which the entire operation of voice processing that processes input voices and synthesizes voices, as described above, is performed in a device 70.

In FIGS. 7 and 8, device environments 50 and 70 may be referred to as client devices and cloud environments 60 and 80 may be referred to as servers.

FIG. 7 shows a schematic block diagram of a speech synthesis apparatus in a speech synthesis system environment according to an embodiment of the present disclosure.

Various components are required to process a voice event in an end-to-end voice UI environment. The sequence that processes a voice event performs processes of signal acquisition and playback of collecting voice signals, speech pre processing, voice activation, speech recognition, natural language processing, and speech synthesis in which an apparatus responds to a user.

The client device 50 may include an input module. The input module can receive user input from a user. For example, the input module can receive user input from a connected external device (e.g., a keyboard or a headset). Further, for example, the input module may include a touch screen. Further, for example, the input module may include a hardware key positioned on a user terminal.

According to an embodiment, the input module may include at least one microphone that can receive user's utterance as a voice signal. The input module includes a speech input system and can receive user's utterance as a voice signal through the speech input system. The at least one microphone can determine a digital input signal for user's utterance by generating an input signal for audio input. According to an embodiment, a plurality of microphones may be implemented as arrays. The arrays may be arranged in a geometric pattern, for example, a linear geometric form, a circular geometric form, or another certain configuration. For example, for a predetermined position, four sensor arrays may be disposed in a circular pattern at each 90 degrees to receive sounds in four directions. In some implements, the microphones may include sensors of spatially different arrays in data communication, and networked arrays of sensor may be included. The microphones may include an omnidirectional microphone and a directional microphone (e.g., a shotgun microphone).

The client device 50 may include a pre-processing module 51 that can pre-process user input (voice signal) received through the input module (e.g., a microphone).

The pre-processing module 51 includes an adaptive echo canceller (AEC) function, thereby being able to remove echoes included in a user voice signal input through the microphone. The pre-processing module 51 includes a noise suppression (NS) function, thereby being able to remove background noise included in user input. The pre-processing module 51 includes an end-point detect (EPD) function, thereby being able to find out the part where a user's voice exists by detecting the end point of the user voice. Further, the pre-processing module 51 includes an automatic gain control (AGC) function, thereby being able to recognize the user input and adjust the volume of the user input to be suitable for processing.

The client device 50 may include voice activation module 52. The voice activation module 52 can recognize a wake-up instruction that recognizes a call of a user. The voice activation module 52 can detect a predetermined keyword (ex, Hi LG) from user input that has undergone a pre-processing process. The voice activation module 52 can perform an always-on keyword detection function by existing in a standby state.

The client device 50 can transmit user voice input to a cloud server. Auto speech recognition (ASR) and natural language understanding (NLU) operations that are core configurations for processing user voice have been traditionally generally performed in a cloud due to computing, storing, and power limitations. The cloud may include a cloud device 60 that processes user input transmitted from a client. The cloud device 60 may exist in a server type.

The cloud device 60 may include an ASR (Auto Speech Recognition) module 61, an artificial intelligent agent 62, an NLU (Natural Language Understanding) module 63, a TTS (Text-to-Speech) module 64, and a service manager 65.

The ASR module 61 can convert user voice input received from the client device 50 into textual data.

The ASR module 61 includes a front-end speech pre-processor. The front-end speech pre-processor extract a representative feature from speech input. For example, the front-end speech pre-processor extracts a spectrum feature that specifies speech input as a sequence of representative multi-dimensional vectors by performing Fourier transform on speech input. Further, the ASR module 61 includes one or more speech recognition models (e.g., acoustic models and/or language models) and can implement one or more speech recognition engine. Example of the speech recognition models include hidden Markov models, Gaussian-Mixture Models, Deep Neural Network Models, n-gram language models, and other statistic models. Examples of the speech recognition engine include a dynamic time distortion-based engine and a weight finite state transformer (WFST). One or more speech recognition models and one or more speech recognition engines can be used to process extracted representative features of the front-end speech pre-processor in order to generate intermediate recognition results (e.g., a phoneme, a phonemic string, and lower words), and consequently text recognition results (e.g., a word, a word string, or a sequence of tokens).

When the ASR module 61 generates a recognition result including text strings (e.g., words, or a sequence of words, or a sequence of tokens), the recognition result is transmitted to a natural language processing module 732 to infer intent. In some example, the ASR module 730 generates a plurality of candidate text expressions of speech input. Each of the candidate text expressions is a sequence of words or tokens corresponding to the speech input.

The NLU module 63 can find out user intent by performing syntactic analysis or semantic analysis. The syntactic analysis can divide grammatical units (e.g., word, phrase, morpheme) and find out what grammatical elements the divided units have. The semantic analysis may be performed using semantic matching, rule matching, formula matching, etc. Accordingly, the NLU module 63 can acquire an any domain, intent, or a parameter for expressing the intent of user input.

The NLU module 63 can determine intent of a user and a parameter using a matching rule divided into a domain, intent, and a parameter for finding out the intent. For example, one domain (e.g., an alarm) may include a plurality of items of intents (e.g., alarm setting and alarm turning-off) and one item of intent may include a plurality of parameters (e.g., time, number of time of repetition, alarming sound, etc.). A plurality of rules, for example, may include one or more necessary element parameters. The matching rule can be stored in a natural language understanding database.

The NLU module 64 finds out the meaning of words extracted from user input using linguistic features of morphemes, phrases, etc. (grammatical elements) and determines user's intent by matching the meaning of the found words to a domain and intent. For example, the NLU module 63 can determine user intent by calculating how many words extracted from user input are included in each domain and intent. According to an embodiment, the NLU module 63 can determine parameters of user input using words that are the bases for finding out the intent. According to an embodiment, the NLU module 63 can determine user's intent using a natural language recognition database in which linguistic features for finding out the intent of user input are stored. Further, according to an embodiment, the NLU module 63 can determine user's intent using a personal language model (PLM). For example, the NLU module 63 can determine user's intent using individualized information (e.g., a phone number list, a music list, schedule information, social network information, etc.). The personal language model, for example, may be stored in a natural language recognition database. According to an embodiment, not only the NLU module 63, but also the ASR module 61 can recognize a user voice with reference to the personal language model stored in the natural language recognition database.

The NLU module 63 may further include a natural language generation module (not shown). The natural language generation module can change designated information into a text type. The information changed into the text type may be a natural language utterance type. The designated information, for example, may include information about additional input, information showing completion of an operation corresponding to user input, or information showing additional input of a user. The information changed into the text type may be transmitted to a client device and then displayed or may be transmitted to a TTS module 64 and then changed into a voice type.

The TTS module 64 can change the text type information into voice type information. The TTS module 64 can receive text type information from the natural language generation module, change the text type information into voice type information, and transmit the voice type information to the client device 50. The client device 50 can output the voice type information through a speaker.

The TTS module synthesizes speech output on the basis of a provided text. For example, the result generated by the ASR module 61 is a text string type. The TTS module 64 converts the text string into audible speech output. The TTS module 64 users a certain appropriate synthesis technique to generate speech output from a text, which includes concatenative synthesis, unit selection synthesis, di-phone synthesis, domain-specifying synthesis, Formant synthesis, Articulatory synthesis, HMM (hidden Markov model)-based synthesis, and sinewave synthesis, but is not limited thereto.

In some embodiments, the TTS module 64 is configured to synthesize individual words on the basis of a phonemic string corresponding words. For example, the phonemic string is associated with the words of a generated text string. The phonetic string is stored in metadata associated with words. The TTS module 64 is configured to directly process a phonetic string in metadata to synthesize speech type words.

A cloud environment generally has processing ability and resources more than a client device, so it can acquire speech output with a quality higher than the actual quality of synthesis in a client. However, the present disclosure is not limited thereto, and obviously, a speech synthesis process can be performed in a client.

Meanwhile, in accordance with an embodiment of the present disclosure, in the client environment, an artificial intelligence processor (AI processor) 62 may be further included. The artificial intelligence processor 62 may be designed to perform at least some functions of the functions that the ASR module 61, the NLU module 62, and/or the TTS module 64 perform. Further, the artificial intelligence processor module 62 can be contribute to performing the individual function of each of the ASR module 61, the NLU module 62, and/or the TTS module 64.

The artificial intelligence processor module 62 can perform the functions described above through deep learning. For the deep learning, many studies (about how to make better representation techniques and how to make models for learning the representation techniques) have been conducted to represent data into a type that can a computer can recognize (e.g., for an image, pixel information is represented as a column vector, etc.) when there is the data and to apply the data to learning. As the result of these efforts, various deep learning techniques such as DNNs (deep neural networks), CNNs (convolutional deep neural networks), an RNN (Recurrent Boltzmann Machine), an RBM (RBM, Restricted Boltzmann Machine), DBNs (deep belief networks), a deep Q-network can be applied to fields such as computer vision, speech recognition, natural language processing, voice/signal processing, etc.

Currently, all of main commercial speech recognition systems (MS Cortana, Skype translator, Google Now, Apple Siri, etc.) are based on deep learning techniques.

In particular, the artificial intelligence processor module 62 can perform various natural language processing processes including machine translation, emotion analysis, information retrieval, using deep artificial neural network structures in the natural language processing field.

On the other hand, the cloud environment may include a service manager 65 that can support the artificial intelligence processor 62 by collecting various individualized items of information. Individualized information that can be acquired through the service manager may include at least one data (a calendar, an application, a messaging service, use of a music application, etc.) that the client device 50 uses through a cloud environment, at least one sensing data (a camera, a microphone, temperature, humidity, a gyro sensor, a C-V2X, a pulse, ambient light, iris scan, etc.) that the client device 50 and/or the cloud 60 collects, and off-device data that are not directly related to the client device 50. For example, the individualized information may include maps, SMS, News, Music, Stock, Weather, and Wikipedia information.

The artificial intelligence processor 62 was represented as a separate block to be discriminated from the ASR module 61, the NLU module 63, and the TTS module 64 for the convenience of description, but the artificial intelligence processor 62 may perform at least some of or all of the functions each of the modules 61, 62, and 64.

In FIG. 7, an example in which the artificial intelligence processor 62 is implemented in a cloud environment due to computing calculation, storage, and power limitations was described above, but the present disclosure is not limited thereto.

For example, FIG. 8 is the same as the case shown in FIG. 7 except that the intelligent processor (AI processor) is included in a cloud device.

FIG. 8 shows a schematic block diagram of a speech synthesis apparatus in a speech synthesis system environment according to another embodiment of the present disclosure.

A client device 70 and a cloud environment 80 shown in FIG. 8 are different in some configurations and functions from the client device 50 and the cloud environment 60 stated in FIG. 7, but can correspond to them. Accordingly, FIG. 7 can be referred to for the detailed functions of corresponding blocks.

Referring to FIG. 8, the client device 70 may include a pre-processing module 71, a voice activation module 72, an ASR module 73, an intelligent processor 74, an NLU module 75, and a TTS module 76. Further, the client device 70 may include an input module (at least one microphone) and at least one output module.

Further, the cloud environment may include a cloud knowledge 80 that stores individualized information in a knowledge type.

For the function of each module shown in FIG. 8, FIG. 7 can be referred to. However, since the ASR module 73, the NLU module 75, and the TTS module 76 are included in the client device 70, communication with a cloud for voice processing such as speech recognition and speech synthesis may not be needed, and accordingly, an immediate and real-time voice processing operation is possible.

The modules shown in FIG. 7 and FIG. 8 are only examples for describing a voice processing process, and modules more than or less than the modules shown in FIG. 7 and FIG. 8 may be included. Further, it should be noted that it is possible to combine two or more modules or to have different modules or different arrays of modules. The various modules shown in FIG. 7 and FIG. 8 may be implemented by one or more signal processing and/or custom integrated circuit, hardware, software commands for execution by one or more processors, firmware, or a combination thereof.

FIG. 9 shows a schematic block diagram of an intelligent processor that can implement start language recognition in accordance with an embodiment of the present disclosure.

Referring to FIG. 9, the intelligent processor 74 can support interactive operation with a user other than performing the ASR operation, the NLU operation, and the TTS operation in the voice processing process described through FIG. 7 and FIG. 8. Alternatively, the intelligent processor 74 can contribute to the NLU module 63 further clarifying, supplementing, or additionally defining information included in text representations received from the ASR module 61, using context information.

In this case, the context information may include a preference of a user of the client device, states of hardware and/or software of the client device, various items of sensor information collected before, during, and immediately after inputting, previous interactions (e.g., a dialogue) between the intelligent processor and the user, etc. In this specification, obviously, the context information is characterized by being dynamic and varied in accordance with time, a position, the contents of a dialogue, and other factors.

The intelligent processor 74 may further include a context fusion and leaning module 741, a local knowledge 7424, and a dialogue management 743.

The context fusion and leaning module 741 can learn user's intent on the basis of at least one data. The at least one data may include at least one sensing data that are acquired from the client device or the cloud environment. Further, the at least one data may include speaker identification, acoustic event detection, private information of a speaker (gender and age detection), voice activity detection (VAD), and emotion classification.

The speaker identification may mean specifying a person who utters in a dialogue group enrolled by voices. The speaker identification may include a process of identifying a pre-enrolled speaker or enrolls a speaker as a new speaker. The acoustic event detection can detect the kind of a sound and the generation place of a sound by recognizing a sound itself beyond a speech recognition technology. The activity detection is a speech processing technology that detects existence or absence of speech (voice) of a human in an audio signal that may include music, noise, or other sounds. In accordance with an embodiment, the intelligent processor 74 can find out whether there is speech from the input audio signal. In accordance with an embodiment, the intelligent processor 74 can discriminate speech data and non-speech data using a DNN (deep neural network) model. Further, the intelligent processor 74 can perform the emotion classification operation on the speech data using the DNN model. In accordance with the emotion classification operation, the speech data may be classified into anger, boredom, fear, happiness, and sadness.

The context fusion and learning module 74 may include a DNN model to perform the operations described above and can find out the intent of user input on the basis of sensing information collected from the DNN model, the client device, or the cloud environment.

The at least one data are only an example, and obviously, any data that can be referred to for finding out user's intent in a voice processing process can be included. Obviously, the at least one data can be acquired through the DNN model described above.

The intelligent processor 74 may include a local knowledge 742. The local knowledge 742 may include user data. The user data may include a reference of a user, a user address, a default language of the user, a phone number list of the user, etc. According to an embodiment, the intelligent processor 74 can additionally define user intent by supplementing the information included in voice input of a user using specific information of the user. For example, in response to a user's request "Please, invite my friends to my birthday party", the intelligent processor 74 can use the local knowledge 742 without requesting a user to provide clearer information in order to determine who are the "friends" and when and where the "birthday part" will be held.

The intelligent processor 74 may further include a dialogue management 743. The intelligent processor 74 can provide a dialogue interface such that a voice dialogue with a user is possible. The dialogue interface may mean a process of outputting a response to voice input of a user through a display or a speaker. In this case, the final result that is output through the dialogue interface may be based on the ASR operation, the NLU operation, and the TTS operation described above.

FIG. 10 is a flowchart showing a voice recognizing method of a voice recognizing apparatus according to an embodiment of the present disclosure.

As shown in FIG. 10, the method S1000 through which the voice recognizing apparatus according to an embodiment of the present disclosure intelligently recognizes a voice includes steps S1010 to S1070, and the detailed description is as follows.

First, the voice recognizing apparatus 10 can receive a voice uttered by a user from the outside (S1010).

In this case, the voice may include a start language. Further, the voice may include an utterance language including at least one word different from the start language. In this case, the utterance language may include a command of a user.

In this case, a voice including sequential utterance language and start language may be referred to as a seamless voice. In this case, a sequential start language uttered sequentially with an utterance language may be referred to as a seamless start language.

In a seamless voice, an utterance language may be uttered first and a start language may be uttered within a pre-set threshold time. Further, in a seamless voice, a start language may be uttered first and an utterance language may be uttered within a pre-set threshold time.

A seamless start language may show vocalization different from a case when only a start language is uttered. In this case, a first seamless start language uttered after an utterance language is uttered may show vocalization different from a second seamless start language uttered before the utterance language is uttered.

In this case, the voice recognizing apparatus 10 can perform pre-processing on a voice using the pre-processing modules 51 and 71 described with reference to FIG. 7 and FIG. 8, and can transmit the pre-processed voice to the voice activation modules 52 and 72.

Next, the voice recognizing apparatus 10 can acquire an utterance language and a sequential start language that has been uttered sequentially with the utterance language from the voice (S1030).

For example, the voice recognizing apparatus 10 can store in real time data of the voice in a buffer (e.g., the memory 140). For example, the voice recognizing apparatus 10 can store data of the voice in the buffer 140, analyze the voice data stored in the buffer 140 using at least one of the voice activation module 52, the ASR modules 61 and 73, and the NLU modules 63 and 75 of FIG. 7 and FIG. 8, and recognize an utterance language and a sequential start language continuing with the utterance language from the voice on the basis of the analysis result.

In this case, the voice recognizing apparatus 10 can determine whether an utterance language and a sequential start language included in the voice exist, using at least one of the voice activation module 52, the ASR modules 61 and 73, and the NLU modules 63 and 75.

Next, the voice recognizing apparatus 10 can determine whether the sequential start language is recognized as a start language of the voice recognizing apparatus 10 (S1050).

For example, the voice recognizing apparatus 10 can recognize a sequential start language continuing with an utterance language, using a start language recognition model, and can determine whether the sequential start language is recognized as a start language of the voice recognizing apparatus on the basis of a start language recognition model.

In this case, the start language recognition model may be learned in advance using a pre-set basic start language before the voice is received in step S1010. In detail, the start language recognition model may be learned in advance to be able to output a recognition score showing the degree of similarity of the received voice and the basic start language in a probability value type. That is, the start language recognition model can have the received voices as an input value and can output the degree of similarity of the received voice and the basic start language in a probability value type.

In this case, the basic start language may be a start language that has been uttered by a user when the voice recognizing apparatus 10 is in a start language recognition mode before step S1010.

In this case, when determining whether the sequential start language is recognized as a start language of the voice recognizing apparatus, the voice recognizing apparatus 10 can determine whether the sequential start language is recognized as a start language of the voice recognizing apparatus on the basis of not only the degree of similarity between the sequential start language and the basic start language, but also state information related to the sequential start language (e.g., the stored period of the sequential start language and whether the user has attempted authentication after the sequential start language was uttered). This will be described in detail later.

When the sequential start language is recognized as a start language of the voice recognizing apparatus, the voice recognizing apparatus 10 can set the sequential start language as an additional start language that can start the voice recognizing apparatus other than the pre-set basic start language (S1070).

For example, the voice recognizing apparatus 10 can additionally set the sequential start language recognized as a start language of the voice recognizing apparatus in step S1050 as a start language that can start the voice recognizing apparatus, in addition to the pre-set basic start language before step S1010. In this case, the start language that can start the voice recognizing apparatus may means a word that can start (or activate) the voice recognizing apparatus of the voice recognizing apparatus.

After step S1070, if a following voice is received from the outside, the voice recognizing apparatus (or the voice recognition function of the voice recognizing apparatus) can be started (activated), when the voice recognizing apparatus 10 recognizes a basic start language in the following voice or recognizes a sequential start language set as an additional start language in the following voice.

For example, when the voice recognizing apparatus (or the voice recognition function of the voice recognizing apparatus) is started (activated), the voice recognizing apparatus 10 can recognize a following uttered command and can enter an instruction standby state that can perform a pre-set function on the basis of the command.

FIG. 11 is a flowchart showing a detailed process of the start language recognition step (S1050) of FIG. 10.

As shown in FIG. 11, after step S1030 (acquisition of sequential start language) of FIG. 10, the voice recognizing apparatus 10 can analyze voice data using the start language recognition model (S1110).

Next, the voice recognizing apparatus 10 can determine whether a start language is recognized in the analyzed voice data on the basis of the analysis result (S1120).

For example, the voice recognizing apparatus 10 can determine whether a start language is recognized in the voice data, using at least one of the voice activation module 52, the ASR modules 61 and 73, and the NLU modules 63 and 75.

When a start language is recognized in the voice data stored in the buffer 140, the voice recognizing apparatus 10 can determine whether an utterance language continuing with the start language is recognized (1130).

For example, the voice recognizing apparatus 10 can determine whether an utterance language continuing with the start language exists in the voice data using the NLU modules 63 and 75 of FIG. 7 and FIG. 8.

In this case, the voice data may be stored in a circular buffer. In this case, the circular buffer stores a plurality of words constituting the voice data in each slot and the words stored in each slot are stored in data structures of which the order can be recognized. Accordingly, the voice recognizing apparatus 10 can determine whether the utterance language continuing with the start language has been uttered after the start language or uttered before the start language by analyzing the voice data stored in the circular buffer after the start language is recognized.

When an utterance language continuing with the start language is recognized, the voice recognizing apparatus 10 can determine whether a sequential start language is positioned before the utterance language (S1140).

Finally, the voice recognizing apparatus 10 can update a first start language recognition model, a second start language recognition model, and a third start language recognition model, which recognize different start languages, on the basis of different start languages (S1150).

In detail, when a start language is positioned before an utterance language, the voice recognizing apparatus 10 can update the third start language recognition model learned to determine whether a start language uttered before an utterance language is recognized as a start language of the voice recognizing apparatus, using the start language uttered before the utterance language (S1153).

When a start language is positioned after an utterance language, the voice recognizing apparatus 10 can update the second start language recognition model learned to determine whether a start language uttered after an utterance language is recognized as a start language of the voice recognizing apparatus, using the start language uttered after the utterance language (S1152).

If only a start language exists in the voice data, the voice recognizing apparatus 10 can update the first start language recognition model learned to determine whether a start language is recognized as a start language of the voice recognizing apparatus, using only the start language.

FIG. 12 is a flowchart showing a detailed process of a step of updating a start language recognition model (S1150) of FIG. 11.

As shown in FIG. 12, the voice recognizing apparatus 10 can acquire a recognition score of a sequential start language by inputting the sequential start language into a voice recognition model (S1200).

In this case, the recognition score of the sequential start language may have a probability value type. That is, the recognition score of the sequential start language may mean the probability of the sequential start language being recognized as a start language in the voice recognizing apparatus.

In this case, the recognition score may include a similarity score related to the degree of similarity between the sequential start language and a pre-set basic start language. For example, the similarity sore may include a speaker verification score showing the verification between the speaker of a basing start language and the speaker of a sequential start language. For example, the similarity sore may include a phrase verification score showing the verification between the phrase of a basing start language and the phrase of a sequential start language. Further, the similarity score may be configured as the sum of the values obtained by applying different weights to the speaker verification score and the phrase verification score, respectively.

Further, the recognition score may include not only the similarity score, but a voice quality score related to a signal to noise ratio (SNR) of voice data.

Further, the recognition score may include a confident verification score related to an authentication attempt of a user has been received within a predetermined time after a sequential start language is uttered. In this case, as an example of the authentication attempt of a user, pattern input or fingerprint input, and all the types of input for an authentication attempt of a user through the input unit 120 of the voice recognizing apparatus within a predetermined time after a start language is uttered.

Further, the recognition score may include an age score related to time that has passed after a sequential start language is stored in a memory (or after being set as an additional start language).

That is, when the sequential start language is input to a start language recognition model learned in advance, the voice recognizing apparatus 10 can acquire output values obtained by multiplying the speaker verification score, the phrase verification score, the voice quality score, the confident verification score, and the age score by different weights, respectively, as output values of the start language recognition model.

However, in FIG. 12, it was described under the assumption that only a signal quality score, a speaker verification score, and a phrase verification score are calculated first in step S1200, and then the age score and the confident verification score are reflected through step S1220 and step S1230.

Referring to FIG. 12 again, the voice recognizing apparatus 10 can determine whether the acquired a recognition score (the speaker verification score, the phrase verification score, the voice quality score, the confident verification score, or the age score) is larger and a pre-set threshold value (S1210).

If even any one of the recognition scores is larger than the threshold value, the voice recognizing apparatus 10 removes the corresponding start language (S1290).

If all the scores are larger than the threshold value, the voice recognizing apparatus 10 can apply the confident verification score showing whether there was an authentication attempt to the recognition score after utterance (S1220).

That is, when an authentication attempt of a user is sensed within a threshold time after the start language is uttered, the voice recognizing apparatus 10 can add a confident verification score obtained by multiplying the recognition score of the corresponding start language by a pre-set weight.

Next, the voice recognizing apparatus 10 can apply the age score described above to the recognition score (S1230).

That is, the voice recognizing apparatus 10 can add to the recognition score to which the confident verification score is added, by applying a pre-set weight to an age score related to the period for which each sequential start language has been stored in a memory.

Next, the voice recognizing apparatus 10 can select an optimal sequential start language having the highest recognition score of sequential start languages recognized for a pre-set period (e.g., one day) (S1240).

Next, the voice recognizing apparatus 10 can update the start language recognition model on the basis of the basic start language, the optimal sequential start language, and the recognition score (S1250).

That is, the voice recognizing apparatus 10 can relearn (or update) the start language recognition model, using the optimal sequential start language and the basic start language as input values and the recognition store acquired for the optimal sequential start language as an output value.

In this case, when the start language recognition model is updated (or relearned), it is possible to output an output value different from that before the start language recognition model is updated, when specific voice data (or a start language) is recognized.

Accordingly, the voice recognizing apparatus 10 can update the recognition score of the optimal sequential start language by inputting the optimal sequential start language into the updated start language recognition model (S1260).

Next, the voice recognizing apparatus 10 can determine whether a storage space is insufficient and the updated recognition score is lower than a lowest score (S1270).

As the result of determination, when the storage space is insufficient and the updated recognition score is lower than the lowest score, the voice recognizing apparatus 10 removes the corresponding start language (S1290).

If the storage space is not insufficient, or if the updated recognition score larger than the lowest score, the voice recognizing apparatus 10 can set the corresponding sequential start language as an additional start language of the voice recognizing apparatus (S1280).

FIG. 13 is a flowchart showing a process of performing a recognition store acquisition step (S1200) of FIG. 12 through a 5G network.

As shown in FIG. 13, the voice recognizing apparatus 10 can transmit a feature value extracted from voice data to a 5G network (S1300).

The voice recognizing apparatus 10 or the processor 170 of the voice recognizing apparatus can control the communication unit 110 to transmit the feature value extracted from voice data (or data of sequential start languages) to an AI processor included in the 5G network. Further, the processor 170 can control the communication unit to receive AI-processed information from the AI processor.

The AI-processed information may include whether a sequential start language is recognized as a current start language of the voice recognizing apparatus in a score (or probability value) type in order to additionally set the sequential start language as a start language of the voice recognizing apparatus.

Meanwhile, the processor 170 can perform an initial access procedure to the 5G network to transmit the voice data to the 5G network. The processor 170 can perform the initial access procedure to the 5G network on the basis of an SSB (Synchronization signal block).

Further, the processor 170 can receive DCI (Downlink Control Information) that is used to schedule transmission of the voice data through a wireless communication unit from a network.

The processor 170 can transmit the voice data to the network on the basis of the DCI.

The voice data is transmitted to the network through a PUSCH, and the SSB and a DM-RS of the PUSCH may be QCL with respect to a QCL type D.

As shown in FIG. 13, the voice recognizing apparatus 10 can transmit a feature value extracted from voice data to a 5G network (S1330).

In this case, the 5G network may include an AI processor or an AI system and the AI system of the 5G network can perform AI processing on the basis of received voice data (S1310).

The AI system can input feature values received from the voice recognizing apparatus 10 to an ANN classifier (S1311). The AI system can analyze an ANN output value (S1313) and can acquire a recognition score (probability value) when a sequential start language in voice data received from the ANN output value is recognized as a start value of the voice recognizing apparatus (S1315). The 5G network can transmit the recognition score (probability value) determined by the AI system to the voice recognizing apparatus 10 through the wireless communication unit.

When determining that the recognition score of the currently determined sequential start language is smaller than a pre-set threshold value, the AI system can transmit information showing that the sequential start language has not been recognized as a start language of the voice recognizing apparatus or a request to remove the voice data to the voice recognizing apparatus 10 (S1320).

Further, when the sequential start language is recognized as a start language of the voice recognizing apparatus (when the recognition score is the threshold value or more), the AI system can transmit a request to additionally set the sequential start language as a start language of the voice recognizing apparatus to the voice recognizing apparatus 10 (S1330).

Meanwhile, unlike that shown in FIG. 12, when the AI system transmits a recognition score to the voice recognizing apparatus 10, the voice recognizing apparatus 10 can determine whether a sequential start language is recognized as a start language of the voice recognizing apparatus on the basis of the recognition score, and can set the sequential start language as a start language of the voice recognizing apparatus on the basis of the result of determination.

Meanwhile, the voice recognizing apparatus 10 may transmit only voice data to the 5G network and may extract a feature value corresponding to input, which will be used as input of an artificial neural network, to determine whether a sequential start language is recognized as a start language of the voice recognizing apparatus from the voice data in the AI system included in the 5G network.

FIG. 14 shows a process of recognizing an utterance language and a start language in voice data.

As shown in FIG. 14, when a user 1410 utters a voice, a voice recognizing apparatus 1420 can receive a voice signal through an input unit 120 (e.g., a microphone) and can transmit the received voice signal to a circular buffer 1421.

The circular buffer 1421 can store the voice signal in a voice data type, and can circularly store all the data to be stored before all of slots are filled.

The processor 170 can transmit voice data stored in the circular buffer 1421 to an auto speech recognition (ASR) module 1422.

The processor 170 can recognize a start language included in the voice data using the ASR module 1422.

Next, if a sequential start language is recognized, the processor 170 can store the voice data in a memory 1423.

Further, the processor 170 can transmit the voice data to speech recognition and natural language understanding (STT & NLP) modules 1424 and 1425.

Next, the processor 170 can determine a start language, an utterance language continuing with the start language, and the order between the start language and the utterance language in the voice data, using the STT & NLP modules 1424 and 1425.

For example, the processor 170 can generate a first sequential start language list 1431 in which a start language is uttered and an utterance language continues in voice data, a second start language list 1432 including only a start language, and a third start language list 1433 that is a start language list continuing an utterance language, using the STT & NLP modules 1424 and 1425.

In this case, the reason of dividing a sequential start language into the first to third start language lists is because the vocalization of start languages is different in each case, so it is preferable to recognize the start language through different start language recognition models.

FIG. 15 shows a process of generating and managing a first, second, and third start language lists.

As shown in FIG. 15, the processor 170 can update a highest-score voice 1511 of recent start languages to a first start language list (first start language DB) 1521.

Further, the processor 170 can update a highest-score voice 1521 of start languages continuing with an utterance language to a second start language list (second start language DB) 1522.

Further, the processor 170 can update a highest-score voice 1531 of start languages continuing before an utterance language to a third start language list (third start language DB) 1532.

Next, the processor 170 can input the first start language list, the second start language list, the third start language list, which are separately generated, and a plurality of start language lists of an initially set start language list (start language DB) 1502 into different start language recognition models 1503 set for the start language lists, respectively, and can learn (update) corresponding start language recognition models 1503 by setting recognition scores calculated fro sequential start language as output values, respectively.

FIG. 16 shows an intuitional voice recognition process using a sequential start language according to an embodiment of the present disclosure.

A voice recognizing apparatus 1620 of FIG. 16 shows a voice recognizing apparatus after finishing the process of updating a start language recognition model described with reference to FIG. 15. That is, the voice recognizing apparatus 1620 of FIG. 16 can acquire a voice after setting an uttered sequential start language as an additional start language that can start the voice recognizing apparatus.

As shown in FIG. 16, when a user 1610 utters a voice, the voice recognizing apparatus 1620 that has set the uttered sequential start language as an additional start language that can start the voice recognizing apparatus can perform a pre-set function on the basis of the result of recognizing the voice.

In detail, when a user 1610 utters words "Hi LG" (1611), the voice recognizing apparatus 10 can determine whether the words "Hi LG" are recognized as a start language of the voice recognizing apparatus 1620. When they are recognized as a start language, the voice recognizing apparatus 10 can start the voice recognizing apparatus.

Further, when the user 1610 utters a voice with a continuing utterance language after uttering a start language "Hi LG, make it cooler" (1612), the voice recognizing apparatus 10 can recognize the start language and the following utterance language first, and then can determine whether the additional start language is recognized at the start language part ("Hi LG") of the voice. As the result of determination, when the additional start language accords with the part "Hi LG", the voice recognizing apparatus 1620 can start a voice recognition function for recognizing a command of the voice recognizing apparatus 1620.

Further, when the user 1610 utters a sequential start language "Make it cooler, Hi LG" (1613), the voice recognizing apparatus 1620 can determine whether an additional start language is recognized from the sequential start language "Make it cooler, Hi LG". As the result of determination, when the additional start language accords with the part "Hi LG", the voice recognizing apparatus 1620 can start a voice recognition function for recognizing a command of the voice recognizing apparatus 1620.

Embodiment 1: A method in which a voice recognizing apparatus intelligently recognizes a voice includes: receiving a voice; and starting the voice recognizing apparatus when a basic start language pre-set as a start language of the voice recognizing apparatus is recognized from the voice, in which the starting includes: acquiring a sequential start language sequentially uttered with an utterance language from the voice; and setting the sequential start language as an additional start language that can start the voice recognizing apparatus other than the basic start language when the sequential start language is recognized as a start language of the voice recognizing apparatus.

Embodiment 2: In the embodiment 1, the starting can include determining whether the sequential start language is recognized as a start language of the voice recognizing apparatus, using a start language recognition model learned on the basis of the basic start language; and updating the start language recognition model on the basis of the sequential start language when the sequential start language is recognized as a start language of the voice recognizing apparatus.

Embodiment 3: In the embodiment 2, the determining of whether the sequential start language is recognized as a start language of the voice recognizing apparatus can perform determination on the basis of a start language recognition score including information related to similarity between the sequential start language acquired using the start language recognition model and the basic start language.

Embodiment 4: In the embodiment 3, the determining of whether the sequential start language is recognized as a start language of the voice recognizing apparatus can apply whether an authentication attempt to the voice recognizing apparatus is sensed before a threshold time passes after the voice is received, to the start language recognition score.

Embodiment 5: In the embodiment 4, the determining of whether the sequential start language is recognized as a start language of the voice recognizing apparatus can apply a time that has passed after the voice was received to the start language recognition score.

Embodiment 6: In the embodiment 5, the method may further include: acquiring a following start language uttered sequentially with an utterance language after the sequential start language is uttered; determining a start language recognition score related to the following start language; and removing one start language of the sequential start language and the following start language on the basis of a start language recognition score of the following start language and a start language recognition score of the sequential start language.

Embodiment 7: In the embodiment 6, the updating of the start language recognition model may include: updating the start language recognition model using the start language recognition score of the sequential start language and the sequential start language; updating the start language recognition score of the sequential start language using the updated start language recognition model; and re-determining whether the sequential start language is recognized as a start language of the voice recognizing apparatus on the basis of the updated start language recognition score.

Embodiment 8: In the embodiment 1, the determining of whether the sequential start language is recognized as a start language of the voice recognizing apparatus can perform determination on the basis of storing orders of the utterance language and the sequential start language.

Embodiment 9: In the embodiment 8, the determining of whether the sequential start language is recognized as a start language of the voice recognizing apparatus may include: putting the sequential start language into a first sequential start language list when data of the sequential start language is stored earlier than the utterance language; putting the sequential start language into a second sequential start language list when data of the sequential start language is stored later than the utterance language; and determining whether a first sequential start language of the first sequential start language list and a second sequential start language of the second sequential start language list are recognized as start languages of the voice recognizing apparatus, using different start language recognition models learned on the basis of different basic start languages.

Embodiment 10: In the embodiment 1, the method may further includes: receiving DCI (Downlink Control Information), which is used to schedule transmission of data of the voice acquired from an input unit of the voice recognizing apparatus, from a network; and transmitting the voice data to the network on the basis of the DCI.

Embodiment 11: In the embodiment 10, the method includes: performing an initial access procedure to the network on the basis of an SSB (Synchronization signal block); and transmitting the voice data to the network through a PUSCH, in which the SSB and a DM-RS of the PUSCH may be QCL with respect to a QCL type D.

Embodiment 12: In the embodiment 10, the method further includes: controlling a communication unit to transmit the voice data to an AI processor included in the network; and controlling the communication unit to receive AI-processed information from the AI processor, in which the AI processed information may be information that has determined whether the sequential start language recognized from the voice data is recognized as a start language of the voice recognizing apparatus.

Embodiment 13: A voice recognizing apparatus that intelligently recognizes a voice includes: an input unit that receives a voice; and a processor that starts the voice recognizing apparatus when a basic start language pre-set as a start language of the voice recognizing apparatus is recognized from the voice, in which the processor: acquires a sequential start language sequentially uttered with an utterance language from the voice; and sets the sequential start language as an additional start language that can start the voice recognizing apparatus other than the basic start language when the sequential start language is recognized as a start language of the voice recognizing apparatus.

Embodiment 14: In the Embodiment 13, the processor can determine whether the sequential start language is recognized as a start language of the voice recognizing apparatus, using a start language recognition model learned on the basis of the basic start language; and update the start language recognition model on the basis of the sequential start language when the sequential start language is recognized as a start language of the voice recognizing apparatus.

Embodiment 15: In the embodiment 14, the processor may determine whether the sequential start language is recognized as a start language of the voice recognizing apparatus on the basis of a start language recognition score including information related to similarity between the sequential start language acquired using the start language recognition model and the basic start language.

Embodiment 16: In the embodiment 15, the processor may apply whether an authentication attempt to the voice recognizing apparatus is sensed before a threshold time passes after the voice is received, to the start language recognition score.

Embodiment 17: In the embodiment 16, the processor may apply a time that has passed after the voice was received to the start language recognition score.

Embodiment 18: In the embodiment 17, the processor may: acquire a following start language uttered sequentially with an utterance language after the sequential start language is uttered, through the input unit; determine a start language recognition score related to the following start language; and remove one start language of the sequential start language and the following start language on the basis of a start language recognition score of the following start language and a start language recognition score of the sequential start language.

Embodiment 19: In the embodiment 18, the processor may: update the start language recognition model using the start language recognition score of the sequential start language and the sequential start language; update the start language recognition score of the sequential start language using the updated start language recognition model; and re-determine whether the sequential start language is recognized as a start language of the voice recognizing apparatus on the basis of the updated start language recognition score.

Embodiment 20: In the embodiment 13, the processor may determine whether the sequential start language is recognized as a start language of the voice recognizing apparatus on the basis of storing orders of the utterance language and the sequential start language.

Embodiment 21: In the embodiment 20, the processor may: put the sequential start language into a first sequential start language list when data of the sequential start language is stored earlier than the utterance language; put the sequential start language into a second sequential start language list when data of the sequential start language is stored later than the utterance language; and determine whether a first sequential start language of the first sequential start language list and a second sequential start language of the second sequential start language list are recognized as start languages of the voice recognizing apparatus, using different start language recognition models learned on the basis of different basic start languages.

Embodiment 22: In the embodiment 13, the apparatus further includes a communication unit, and the processor can: receive DCI (Downlink Control Information), which is used to schedule transmission of data of the voice acquired from the input unit, from a network through the communication unit; and transmit the voice data to the network through the communication unit on the basis of the DCI.

Embodiment 23: In the embodiment 22, the processor may: perform an initial access procedure to the network on the basis of an SSB (Synchronization signal block) through the communication unit; and transmit the voice data to the network through a PUSCH, in which the SSB and a DM-RS of the PUSCH may be QCL with respect to a QCL type D.

Embodiment 24: In the embodiment 22, the processor may: transmit the voice data to an AI processor included in the network through the communication unit; and receive AI-processed information from the AI processor, in which the AI processed information may be information that has determined whether the sequential start language recognized from the voice data is recognized as a start language of the voice recognizing apparatus.

Embodiment 25: A non-transitory computer-readable recording medium is a non-transitory computer-readable recording medium in which a computer-executable component configured to be executed in one or more processors of a computing device, in which the computer-executable component: receives a voice; starts the voice recognizing apparatus when a basic start language pre-set as a start language of the voice recognizing apparatus is recognized from the voice; acquires a sequential start language sequentially uttered with an utterance language from the voice; and sets the sequential start language as an additional start language that can start the voice recognizing apparatus other than the basic start language when the sequential start language is recognized as a start language of the voice recognizing apparatus.

According to embodiments of the present disclosure, the intelligent voice recognizing method, apparatus, and intelligent computing device may present the following effects.

The present disclosure enrolls a seamless scheme voice in which a start language and a sequential language are continued, as a voice of a user, thereby being able to authenticate a user and recognize a voice even through a seamless scheme voice that is uttered in an actual situation.

Further, it is possible to use even natural utterance of a user as a user authentication means.

Further, by using a start language part of sound data of a seamless scheme given by a sound instruction of a user, it is possible to deterioration of performance that may be generated due to a vocalization difference between a start language used when the user was enrolled and a start language of a voice of a seamless scheme that is used in an actual situation.

Further, by removing old voices from enrolled voices, recent vocalization of a user can be reflected to voice recognition of the user.

Further, by enrolling only voices fitted to pre-set conditions such as the highest score for a day, it is possible to prevent frequent update.

The effects of the present disclosure are not limited to the effects described above and other effects can be clearly understood by those skilled in the art from the following description.

The above-described disclosure may be implemented in computer-readable code in program-recorded media. The computer-readable media include all types of recording devices storing data readable by a computer system. Example computer-readable media may include hard disk drives (HDDs), solid state disks (SSDs), silicon disk drives (SDDs), ROMs, RAMs, CD-ROMs, magnetic tapes, floppy disks, and/or optical data storage, and may be implemented in carrier waveforms (e.g., transmissions over the Internet). The foregoing detailed description should not be interpreted not as limiting but as exemplary in all aspects. The scope of the present disclosure should be defined by reasonable interpretation of the appended claims and all equivalents and changes thereto should fall within the scope of the disclosure.

What is claimed is:

1. A method in which a voice recognizing apparatus intelligently recognizes a voice, the method comprising:
   receiving a voice; and
   starting the voice recognizing apparatus when a basic start language pre-set as a start language of the voice recognizing apparatus is recognized from the voice,
   wherein the starting includes:
      acquiring a sequential start language sequentially uttered with an utterance language from the voice;
      determining whether the sequential start language is recognized as a start language of the voice recognizing apparatus, using a start language recognition model learned based on the basic start language;
      updating the start language recognition model based on the sequential start language when the sequential start language is recognized as a start language of the voice recognizing apparatus; and
      setting the sequential start language as an additional start language that can start the voice recognizing apparatus other than the basic start language when the sequential start language is recognized as a start language of the voice recognizing apparatus,
   wherein the determining of whether the sequential start language is recognized as a start language of the voice recognizing apparatus performs determination based on a start language recognition score including information related to similarity between the sequential start language acquired using the start language recognition model and the basic start language, and applies whether an authentication attempt to the voice recognizing apparatus is sensed before a threshold time passes after the voice is received, to the start language recognition score.

2. The method of claim 1, wherein the determining of whether the sequential start language is recognized as a start language of the voice recognizing apparatus applies a time that has passed after the voice was received to the start language recognition score.

3. The method of claim 2, further comprising:
   acquiring a following start language uttered sequentially with an utterance language after the sequential start language is uttered;
   determining a start language recognition score related to the following start language; and
   removing one start language of the sequential start language and the following start language based on a start language recognition score of the following start language and a start language recognition score of the sequential start language.

4. The method of claim 3, wherein the updating of the start language recognition model includes:
   updating the start language recognition model using the start language recognition score of the sequential start language and the sequential start language;
   updating the start language recognition score of the sequential start language using the updated start language recognition model; and
   pre-determining whether the sequential start language is recognized as a start language of the voice recognizing apparatus based on the updated start language recognition score.

5. The method of claim 1, wherein the determining of whether the sequential start language is recognized as a start language of the voice recognizing apparatus performs determination based on storing orders of the utterance language and the sequential start language.

6. The method of claim 5, wherein the determining of whether the sequential start language is recognized as a start language of the voice recognizing apparatus includes:
   putting the sequential start language into a first sequential start language list when data of the sequential start language is stored earlier than the utterance language;
   putting the sequential start language into a second sequential start language list when data of the sequential start language is stored later than the utterance language; and
   determining whether a first sequential start language of the first sequential start language list and a second sequential start language of the second sequential start language list are recognized as start languages of the voice recognizing apparatus, using different start language recognition models learned based on different basic start languages.

7. The method of claim 1, further comprising:
   receiving DCI (Downlink Control Information), which is used to schedule transmission of data of the voice acquired from at least one microphone of the voice recognizing apparatus, from a network; and
   transmitting the voice data to the network based on the DCI.

8. The method of claim 7, further comprising:
   performing an initial access procedure to the network based on an SSB (Synchronization signal block); and
   transmitting the voice data to the network through a PUSCH (physical uplink shared channel), wherein the SSB and a DM-RS of the PUSCH are QCL (quasi co-located) with respect to a QCL type D.

9. The method of claim 7, further comprising:
controlling a RF (radio frequency) module to transmit the voice data to an AI (artificial intelligence) processor included in the network; and
controlling the RF module to receive AI-processed information from the AI processor,
wherein the AI processed information is information that has determined whether the sequential start language recognized from the voice data is recognized as a start language of the voice recognizing apparatus.

10. A voice recognizing apparatus that intelligently recognizes a voice, the voice recognizing apparatus comprising:
at least one microphone that receives a voice; and
a processor that starts the voice recognizing apparatus when a basic start language pre-set as a start language of the voice recognizing apparatus is recognized from the voice,
wherein the processor:
acquires a sequential start language sequentially uttered with an utterance language from the voice;
determines whether the sequential start language is recognized as a start language of the voice recognizing apparatus, using a start language recognition model learned based on the basic start language;
updates the start language recognition model based on the sequential start language when the sequential start language is recognized as a start language of the voice recognizing apparatus; and
sets the sequential start language as an additional start language that can start the voice recognizing apparatus other than the basic start language when the sequential start language is recognized as a start language of the voice recognizing apparatus,
wherein the processor determines whether the sequential start language is recognized as a start language of the voice recognizing apparatus based on a start language recognition score including information related to similarity between the sequential start language acquired using the start language recognition model and the basic start language, and
applies whether an authentication attempt to the voice recognizing apparatus is sensed before a threshold time passes after the voice is received, to the start language recognition score.

11. The voice recognizing apparatus of claim 10, wherein the processor applies a time that has passed after the voice was received to the start language recognition score.

12. The voice recognizing apparatus of claim 11, wherein the processor:
acquires a following start language uttered sequentially with an utterance language after the sequential start language is uttered, through the at least one microphone;
determine a start language recognition score related to the following start language; and
removes one start language of the sequential start language and the following start language based on a start language recognition score of the following start language and a start language recognition score of the sequential start language.

13. The voice recognizing apparatus of claim 12, wherein the processor:
updates the start language recognition model using the start language recognition score of the sequential start language and the sequential start language;
updates the start language recognition score of the sequential start language using the updated start language recognition model; and
pre-determines whether the sequential start language is recognized as a start language of the voice recognizing apparatus based on the updated start language recognition score.

14. The voice recognizing apparatus of claim 10, wherein the processor determines whether the sequential start language is recognized as a start language of the voice recognizing apparatus based on storing orders of the utterance language and the sequential start language.

* * * * *